US012428078B2

(12) United States Patent
Sheppard

(10) Patent No.: US 12,428,078 B2
(45) Date of Patent: Sep. 30, 2025

(54) WHEEL-TO-TRACK CONVERSION SYSTEM

(71) Applicant: Strickland Tracks Limited

(72) Inventor: Luke Sheppard, Worcester (GB)

(73) Assignee: Strickland Tracks Limited (GB)

( * ) Notice: Subject to any disclaimer, the term of this patent is extended or adjusted under 35 U.S.C. 154(b) by 803 days.

(21) Appl. No.: 17/694,732

(22) Filed: Mar. 15, 2022

(65) Prior Publication Data
US 2022/0297774 A1  Sep. 22, 2022

Related U.S. Application Data

(60) Provisional application No. 63/161,645, filed on Mar. 16, 2021.

(51) Int. Cl.
*B62D 55/04* (2006.01)
*B62D 49/06* (2006.01)
*B62D 55/108* (2006.01)
*B62D 55/125* (2006.01)
*B62D 55/14* (2006.01)
(Continued)

(52) U.S. Cl.
CPC ......... *B62D 55/04* (2013.01); *B62D 49/0635* (2013.01); *B62D 55/108* (2013.01);
(Continued)

(58) Field of Classification Search
CPC ............. B62D 49/0635; B62D 55/108; B62D 55/125; B62D 55/14; B62D 55/244; B62D 55/305; B62D 55/04
(Continued)

(56) References Cited

U.S. PATENT DOCUMENTS 3,689,123 A * 9/1972 Barbieri ................. B62D 55/04
180/9.5
3,834,771 A * 9/1974 Firstenberg ............ B62D 55/13
180/9.62
(Continued)

FOREIGN PATENT DOCUMENTS

EP          3150468 A2    4/2017
EP          3150468 A3    4/2017

OTHER PUBLICATIONS

Examination Report for EP application No. 22162497.6, dated Aug. 20, 2024, 5 pages.
(Continued)

*Primary Examiner* — Valentin Neacsu
(74) *Attorney, Agent, or Firm* — Chambliss, Bahner & Stophel, P.C.; Stephen D. Adams

(57) ABSTRACT

A track assembly mounted to a rotating wheel drive of a vehicle that includes a frame with inboard and outboard frame members having a center gap between them. A bearing housing is mounted to the outboard frame member. A hub adaptor has a peripheral wall forming a hollow interior that receives the wheel drive. Separate annular flanges are connected to and extend away from inner and outer surfaces of the peripheral wall and connect to the wheel drive and a sprocket surrounding the hub adaptor. As the hub adaptor rotates within the bearing housing, the sprocket rotates within the center gap of the frame. Idler are rotatably connected to opposed ends of the frame. An endless track is routed over the sprocket and around the idlers. The endless track engages with and is driven by rotation of the sprocket in order to circulate the track about the frame in a generally triangular path.

20 Claims, 17 Drawing Sheets

(51) Int. Cl.
   *B62D 55/24*  (2006.01)
   *B62D 55/30*  (2006.01)
(52) U.S. Cl.
   CPC ........... *B62D 55/125* (2013.01); *B62D 55/14* (2013.01); *B62D 55/244* (2013.01); *B62D 55/305* (2013.01)
(58) Field of Classification Search
   USPC ........................................................ 180/9.3
   See application file for complete search history.

(56) References Cited

U.S. PATENT DOCUMENTS

| | | | | |
|---|---|---|---|---|
| 6,983,812 | B2 * | 1/2006 | Tucker | B62D 55/065 |
| | | | | 180/9.1 |
| 9,505,451 | B2 * | 11/2016 | Zuchoski | B62D 55/04 |
| 10,059,389 | B2 * | 8/2018 | Sewell | B62D 55/15 |
| 2014/0091615 | A1 * | 4/2014 | Knobloch | B62D 55/14 |
| | | | | 305/136 |
| 2014/0091616 | A1 * | 4/2014 | Joseph Xavier | B62D 55/14 |
| | | | | 305/136 |
| 2018/0043947 | A1 * | 2/2018 | Brazier | B62D 55/04 |
| 2019/0071140 | A1 * | 3/2019 | Buchanan | B62D 55/135 |
| 2022/0297774 | A1 * | 9/2022 | Sheppard | B62D 55/108 |

OTHER PUBLICATIONS

Extended European Search Report for EP application No. 22162497.6, dated Sep. 13, 2022, 7 pages.

* cited by examiner

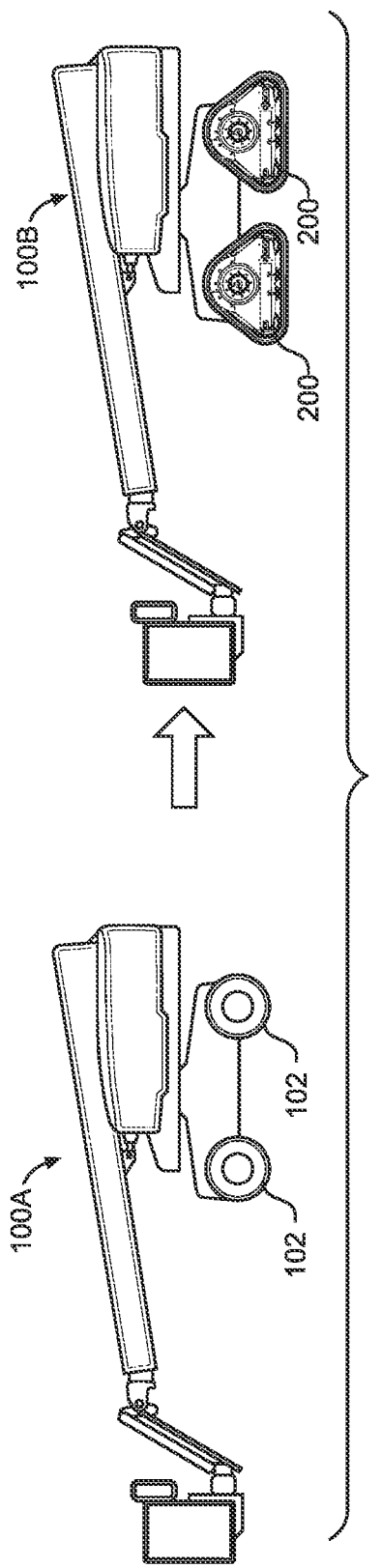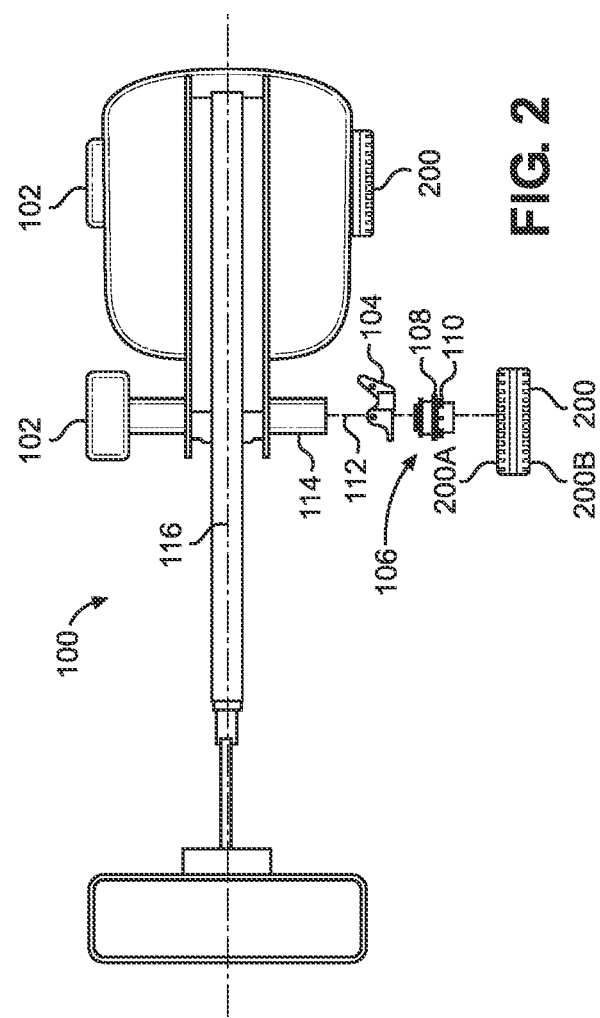

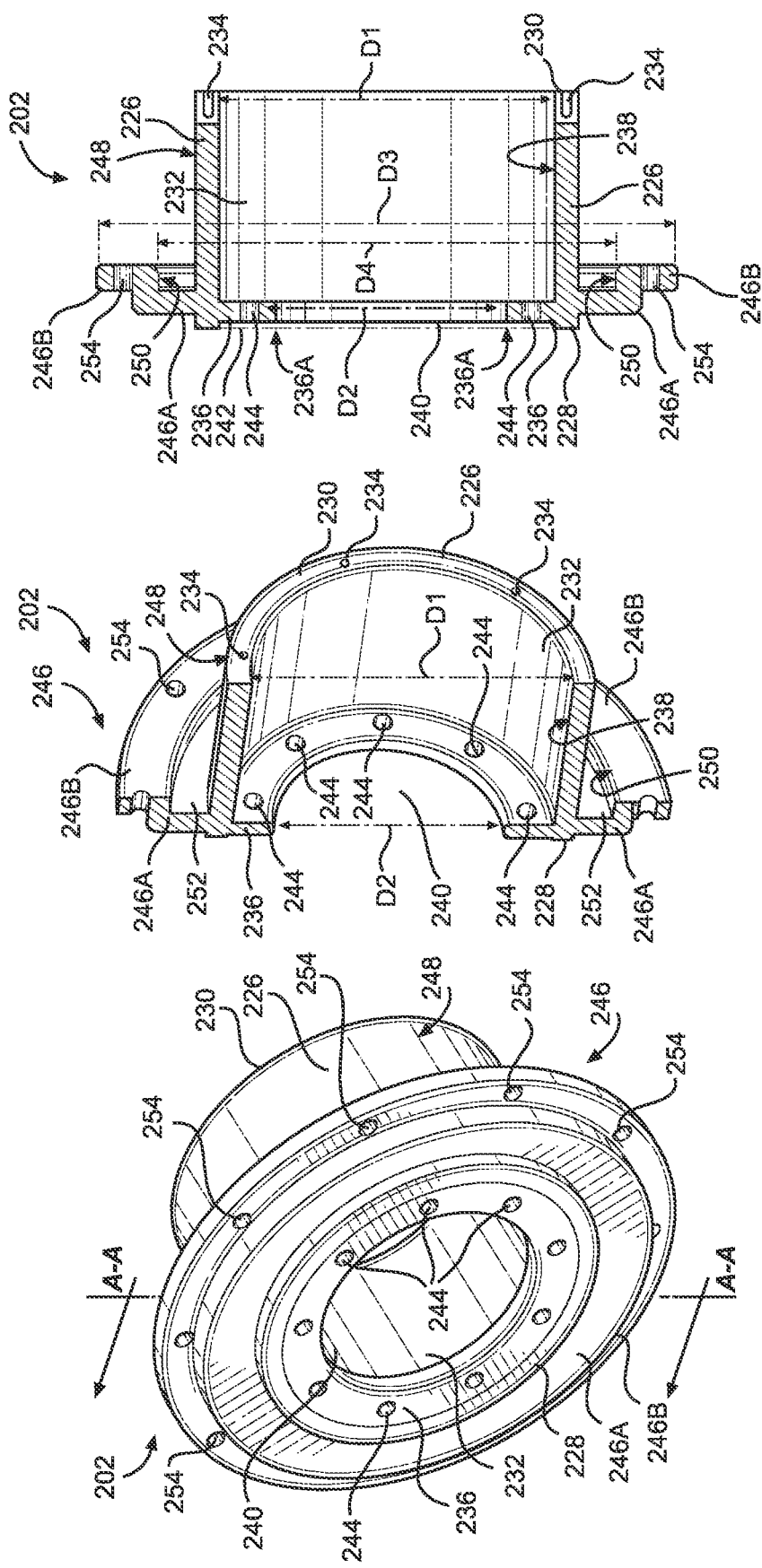

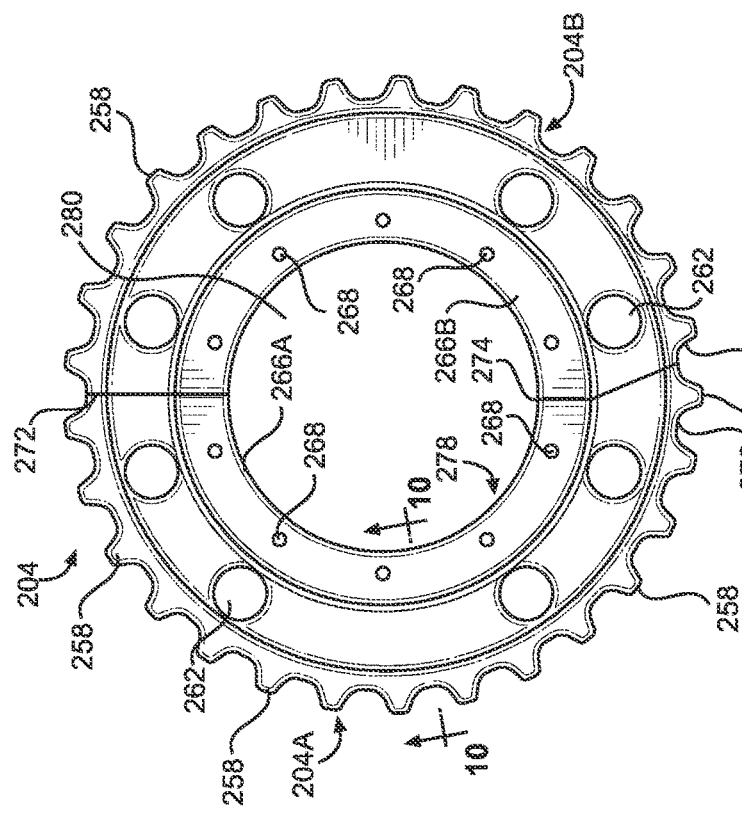
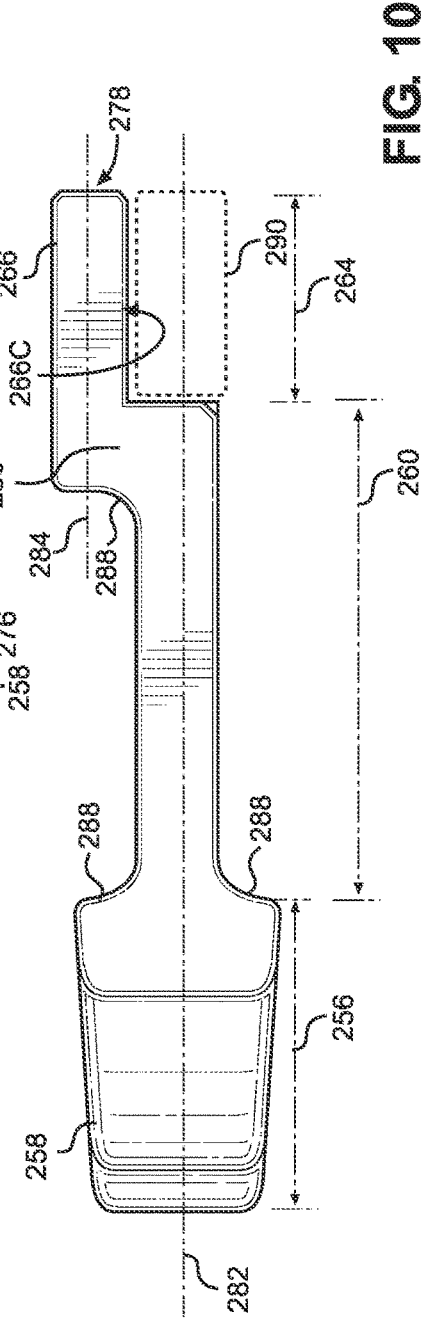
FIG. 9
FIG. 10

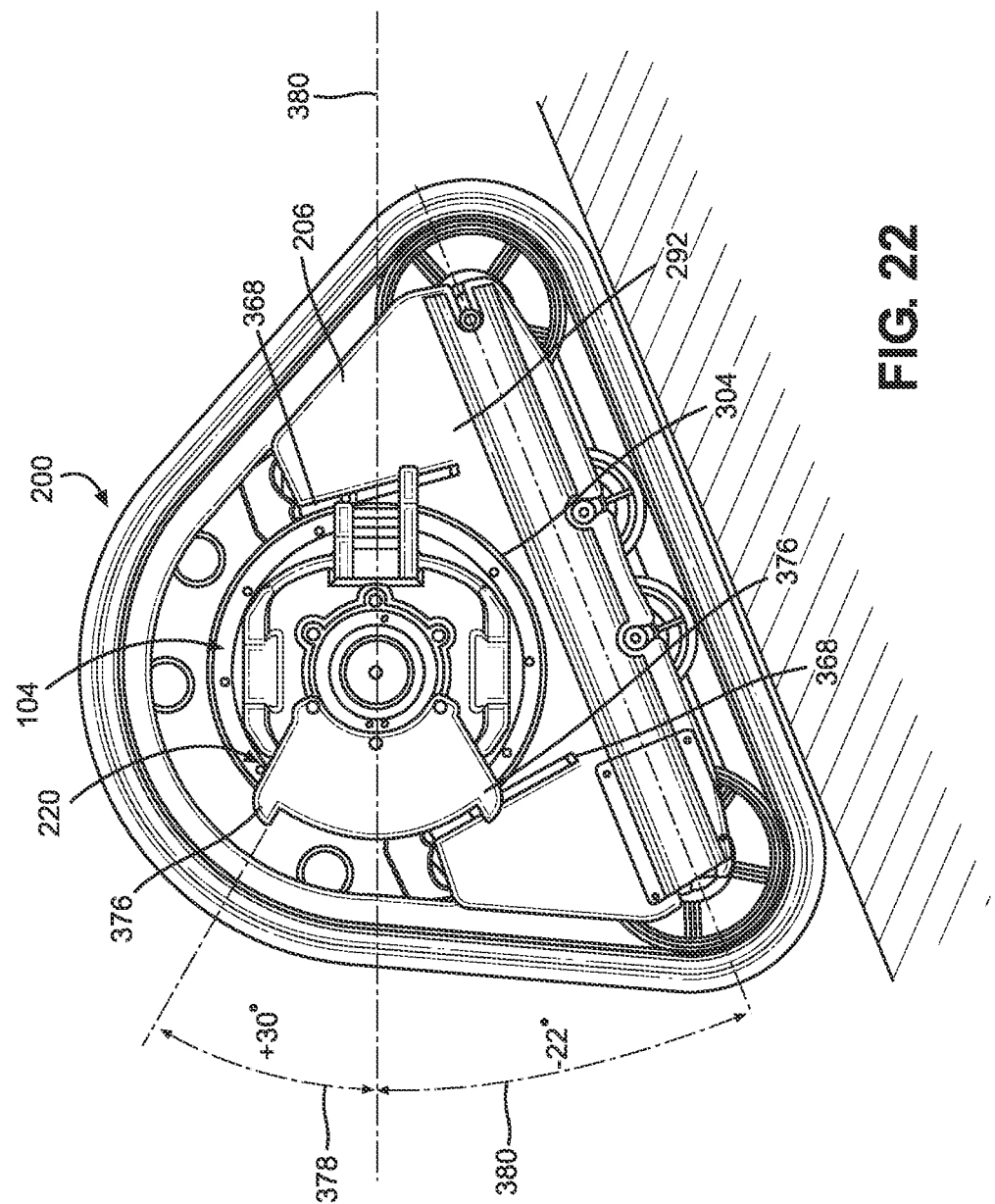

WHEEL-TO-TRACK CONVERSION SYSTEM

CROSS-REFERENCE TO RELATED APPLICATIONS

This application claims the benefit of U.S. Provisional Application No. 63/161,645 filed Mar. 16, 2021, and entitled WHEEL-TO-TRACK CONVERSION SYSTEM, which is incorporated herein by reference in its entirety.

FIELD

This invention relates generally to a wheel-to-track conversion system. More specifically, the present invention relates to track assembly that may be used to convert steerable, all-wheel drive vehicles to steerable, multi-track vehicles.

BACKGROUND

Steerable, all-wheel drive and all-terrain vehicles are well known to the art. It is also known to provide conversion systems for converting these vehicles from a wheel-driven vehicle to a track-driven vehicle. However, these conventional wheel-to-track conversion systems utilize complicated designs, with a large number of parts including a large number of moving parts, which results in high costs to manufacture, operate, and maintain. These complicated designs also provide more opportunities for mechanical breakdowns. Additionally, these complicated designs often require a significant amount manpower and time during the actual conversion process to remove the existing wheels and to then replace them with tracks in order to manage the wheel-to-track conversion for the vehicle.

Accordingly, what is needed is a wheel-to-track conversion system that provides a simpler design that is easier and less costly to manufacture, maintain, and utilize.

SUMMARY OF THE INVENTION

It is an aim and an advantage of this prevent design to provide a much simpler device that eliminate much of the unnecessary complexity (i.e., functionality and components) of prior designs. This simplicity provides for a much more straight forward conversion process and also provides much lower costs and manpower requirements to manufacture, operate and maintain than conventional systems. The track assembly of the present invention is useful for vehicles that are designed to be able to be used on improved road beds as well as unimproved, off-road surfaces, and is particularly useful for converting wheeled vehicles such as tractors, agricultural equipment and specialized heavy or other construction equipment, to track-driven versions of the same. Another major advantage of the presently-disclosed track assembly is that the mounting location for mounting the track assembly to the wheel drive is located within an internal portion of a hub adaptor, and that internal portion may be accessed by simply removing an externally-accessible cap plate. Thus, the track assembly may be easily placed onto the vehicle 100 from the outboard side of the track assembly and without requiring access to the inboard side of the track assembly.

Disclosed herein is a track assembly mounted to a rotating wheel drive of a vehicle that includes a frame with inboard and outboard frame members having a center gap between them. A bearing housing is mounted to the outboard frame member. A hub adaptor has a peripheral wall forming a hollow interior that receives the wheel drive. Separate annular flanges are connected to and extend away from inner and outer surfaces of the peripheral wall and connect to the wheel drive and a sprocket surrounding the hub adaptor. As the hub adaptor rotates within the bearing housing, the sprocket rotates within the center gap of the frame. Idler are rotatably connected to opposed ends of the frame. An endless track is routed over the sprocket and around the idlers. The endless track engages with and is driven by rotation of the sprocket in order to circulate the track about the frame in a generally triangular path.

Also disclosed is a quick connect method for mounting a track assembly of the present invention to an outboard end of a rotating wheel drive of a vehicle, wherein, while directly accessing the first annular flange of the hub adaptor from an outboard side of the track assembly via the outboard end of the ring-shaped lip, the first annular flange is mounted to the wheel drive.

NOTES ON CONSTRUCTION

The use of the terms "a", "an", "the" and similar terms in the context of describing embodiments of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein:

FIG. 1 illustrates a vehicle (depicted as an aerial work platform) before and after having wheels replaced with tracks using a track assembly according to an embodiment of the present invention;

FIG. 2 is a partially exploded view depicting a vehicle having an exposed axle, a wheel drive, and a steering yoke interposed between a track assembly and the axle;

FIG. 6 is a rear perspective view illustrating a hub adaptor of the track assembly of FIG. 5;

FIG. 7 is a is a front perspective sectional view illustrating the hub adaptor of FIG. 6 and taken along plane AA;

FIG. 8 is a side elevation sectional view illustrating the hub adaptor of FIG. 6 and taken along plane AA;

FIG. 9 is a front elevation illustrating a drive sprocket of the track assembly of FIG. 2;

FIG. 10 is a sectional view of the drive sprocket of FIG. 9 taken along line 10-10;

FIG. 22 is a rear elevation view depicting a rotation limiter plate contacting a frame stop in order to limit rotation of a frame of a track assembly with respect to a front axle to which the track assembly is mounted according to an embodiment of the present invention;

DETAILED DESCRIPTION

Figure 3:
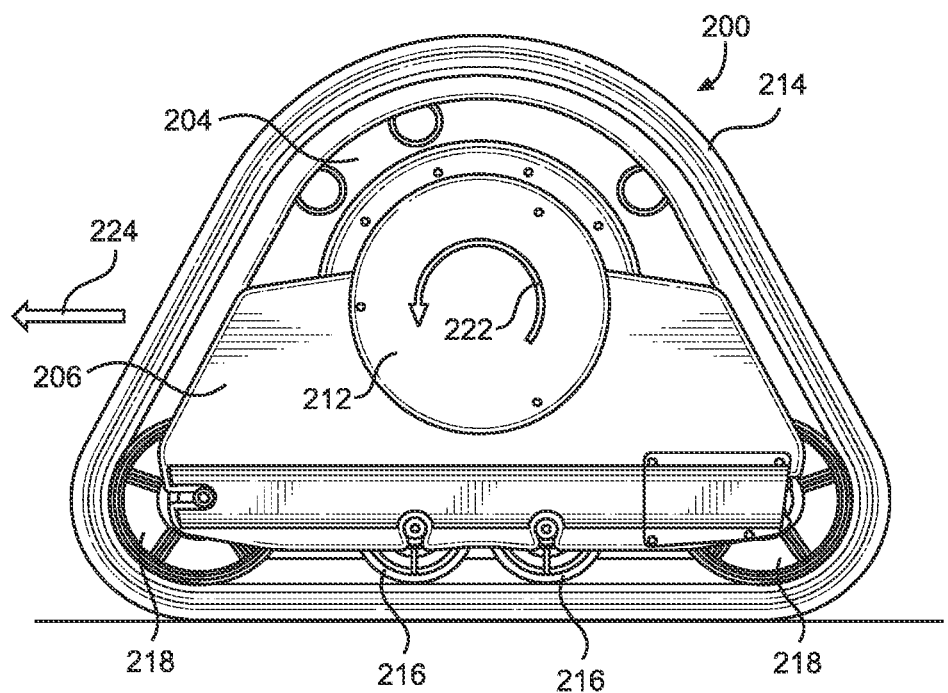
FIG. 3 is a front elevation view of the track assembly of FIG. 1 showing a direction of rotation of a drive sprocket and a track and a corresponding direction of travel.

Referring now to the drawings in which like reference characters designate like or corresponding characters throughout the several views, there is shown in FIGS. 1 and 2 a generic vehicle 100 (depicted as an aerial work platform) having a plurality of wheels 102. The vehicle of FIGS. 1 and 2 and other wheeled vehicles (e.g., loaders, trucks, bulldozers), preferably all-wheel drive vehicles, may be converted to a tracked vehicle using track assembly systems and methods of the present invention. An exemplary track assembly 200 according to an embodiment of the present invention that may be used in converting wheeled vehicle 100 into a track vehicle is illustrated in right-hand side of FIG. 1. Reference number 100A is used to refer to the vehicle 100 that is transported on wheels 102 and prior to the conversion process, while reference number 100B is used to refer to the vehicle after the conversion process to a vehicle transported via track assembly 200.

Figure 4:
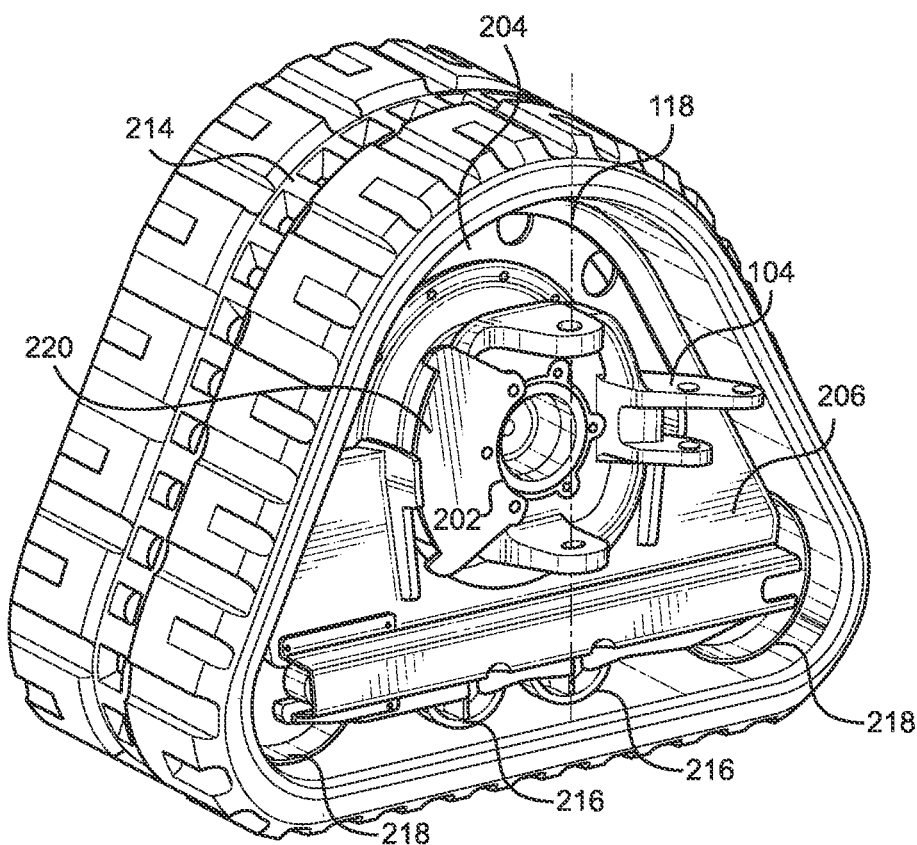
FIG. 4 is a rear perspective view of the track assembly of FIG. 1.
Figure 5:
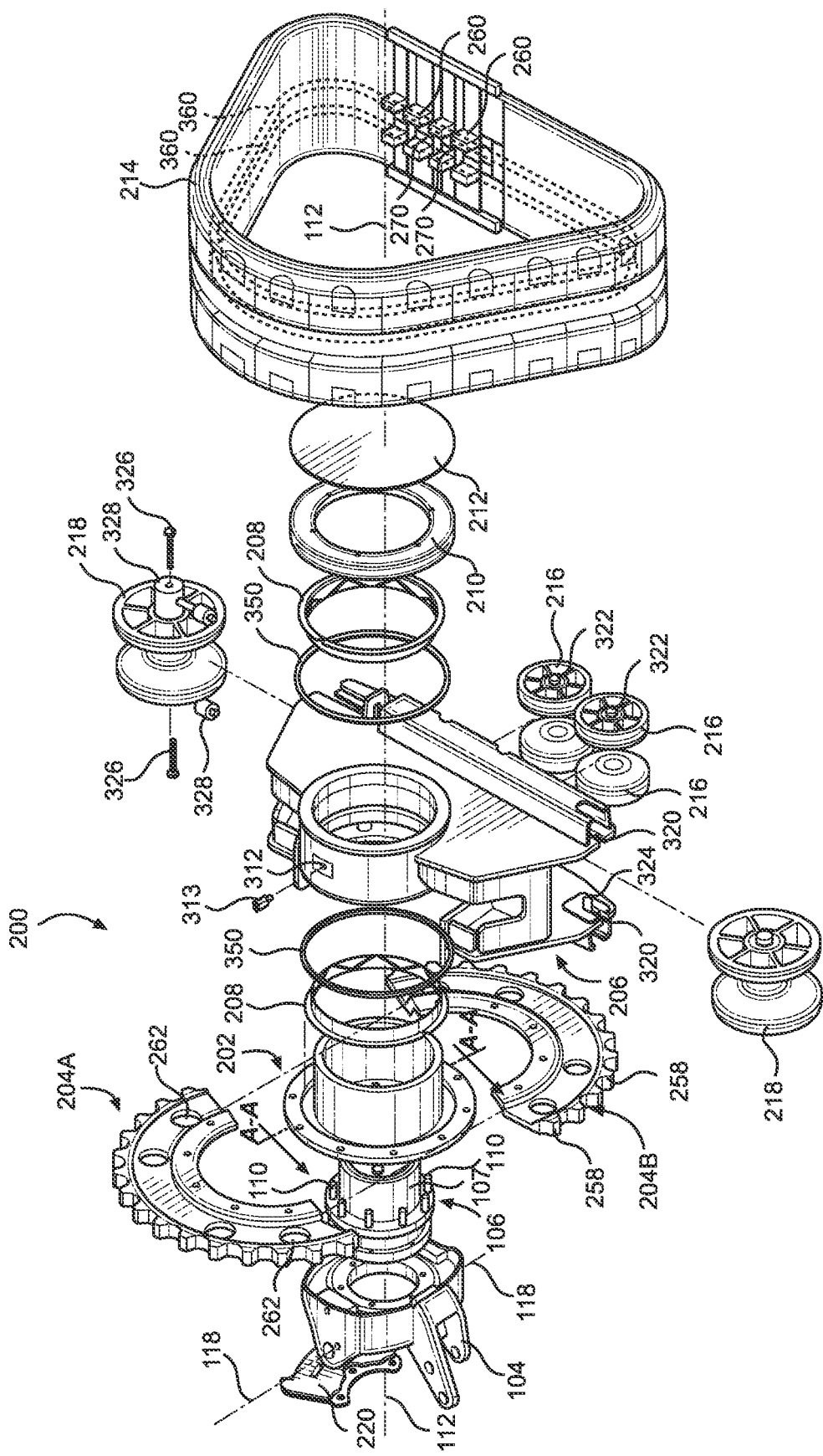
FIG. 5 is a exploded, perspective, outboard view of the track assembly of FIG. 1.

Now also referring to FIGS. 3-5, a typical vehicle 100 with which the track assembly(ies) 200 may be used will include a wheel drive 106 with a cylindrical end 107 having a flange 108 and fasteners 110 (e.g., bolts) onto which a wheel 102 is normally attached and secured with fastening elements, such as nuts (not illustrated). A separate track assembly 200 is preferably mounted to each wheel drive 106 of the vehicle 100 in place of each of the wheels 102 in order to convert the wheeled vehicle 100A to the track-driven vehicle 100B. During operation of the vehicle 100, the wheel drive 106 is rotated about a drive axis 112 by an axle 114 of the vehicle. Vehicle 100 has a longitudinal axis 116 that extends through the middle of the vehicle and through the front and back ends of the vehicle. As the term is used herein, "inboard" means closer towards this longitudinal axis 116 and "outboard" means further from this longitudinal axis. For example, an inboard side of track assembly 200 is indicated in FIG. 2 by reference number 200A and an outboard side of the track assembly is indicated by reference number 200B. When the wheels 102 are steerable, the wheel drive 106 may be pivotally mounted to the axle by way of steering yoke 104, which is configured to pivot the wheel drive about a generally vertical steering axis 118 (as seen in FIG. 4). Once the respective wheel 102 of the vehicle 100 has been removed, a track assembly 200 of the present invention may be connected to the axle 114. More particularly, the track assembly may be directly mounted to the wheel drive 106 using bolts 110 and corresponding nuts.

In general and as further detailed below, a track assembly 200 of the present invention preferably includes a hub adaptor 202, sprocket 204 (composed of sprocket segments 204A and 204B in the illustrated embodiment), frame 206, bearings 208, bearing retainer 210, cap plate 212 having a central opening, endless track 214, two or more pairs of small intermediate rollers 216 or bogeys that are rotatably coupled to the frame, idlers 218 rotatably coupled at opposing ends of the frame on either side of the rollers, and a rotation limiter plate 220 that is mounted to the inboard side of steering yoke 104. As detailed below, the hub adaptor 202 rigidly joins the wheel drive 106 and the sprocket 204 together such that they rotate together with one another about drive axis 112. The hub adaptor 202 is also rotatably received by the frame 206 such that the wheel drive 106, hub adaptor 202, and sprocket 204 all rotate together with respect to the frame. Endless track 214 is placed over and circulates about the sprocket 204, rollers 216, and idlers 218 in a generally triangular configuration having a wide base and tapering to a comparatively narrower peak. Circulation of the endless track 214 in track travel direction 222 (FIG. 3) results in the track assembly 200 traveling in travel direction 224 and reversing the track travel direction would, of course, reverse the travel direction of the track assembly.

Figure 11:
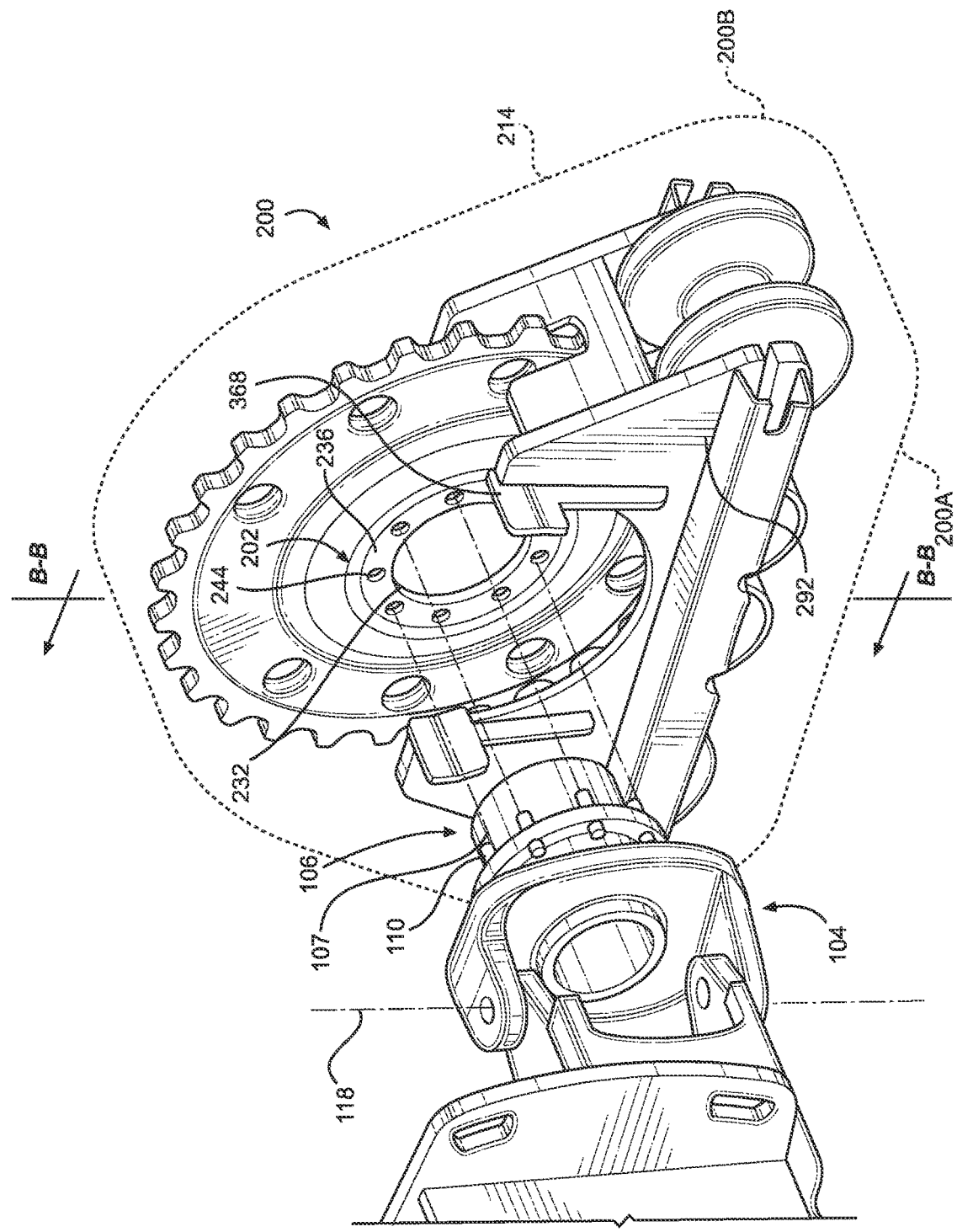
FIG. 11 is a rear perspective view illustrating the track assembly of FIG. 4 being mounted to a wheel drive and steering yoke of a vehicle.

With continued reference 5 and with further reference to FIGS. 6-8, hub adaptor 202 is preferably formed by a cylindrically-shaped peripheral wall 226 having an inboard end 228, an outboard end 230, and an internal diameter D1, which defines a hollow interior (generally denoted by reference number "232") having inboard and outboard openings located at each end. Openings 234, which are preferably threaded openings, are formed in spaced apart arrangement along the entire outboard end 230 of the peripheral wall 226. As will be understood, the openings 234 may differ in terms of type (e.g., threaded vs. smooth), numbers, patterns, depending upon the particular vehicle to which a track assembly 200 is to be attached. An inner or first annular flange 236 extends inward from an inner surface 238 of the peripheral wall 226. The first annular flange 236 is located proximate the inboard end 228 of the peripheral wall 226 and provides a center opening 240 having a diameter D2 that is smaller than D1. The inner surface 238 of the peripheral wall 226 is preferably a plain or smooth surface. Fastener openings 244, preferably plain (i.e., unthreaded) openings, are formed in the first annular flange 236 in spaced apart arrangement around the entire hollow interior 232. The number and position of openings 244 correspond to the number and position of fasteners 110 of wheel drive 106, such that the fasteners may be inserted into the openings and then secured with nuts in order to secure wheel drive to hub adaptor. With additional reference to FIG. 11, wheel drive 106 is connected to hub adaptor 202 by inserting cylindrical end 107 into hollow interior 232 of hub adaptor 202 via center opening 240, such that fasteners 110 are inserted into corresponding fastener openings 244, and then securing the connection with the appropriate nut (not shown). Advantageously, this mounting process is much simpler with the presently-disclosed track assembly 200 when compared to methods used for mounting conventional wheel-to-track conversion systems to a vehicle, because it can be accomplished entirely from the outboard side 200B of the track assembly 200.

Figure 18:
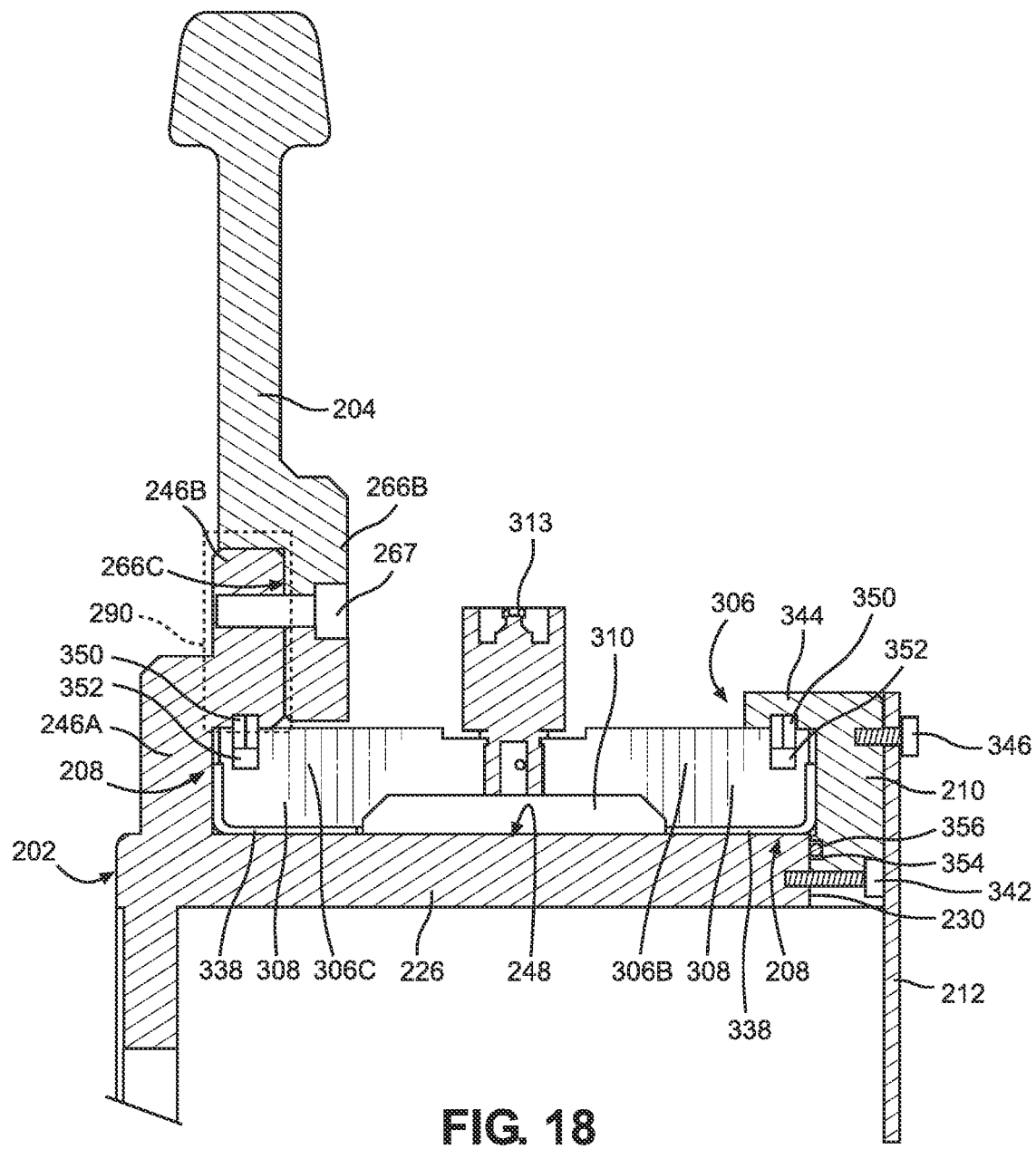
FIG. 18 is a sectional view illustrating an upper portion of a bearing housing and hub adaptor mounted to a sprocket of a track assembly according to an embodiment of the present invention.

In addition to first annular flange 236, the hub adaptor 202 also includes annular flange portion 246A that is joined to an outer surface 248 of the peripheral wall 226 and is also joined together with a larger diameter second annular flange portion 246B. The two flange portions 246A, 246B, in combination, form an outer or second annular flange 246. The second flange 246 extends outwardly from the inboard end 228 of the peripheral wall 226 at a position along the length of the peripheral wall that is almost aligned with the first annular flange 236 (as seen best in FIG. 8), which extends inwardly from the inboard end of the peripheral wall. In certain embodiments, flange 236 is aligned with flange portion 246A or with flange portion 246B. However, in the illustrated embodiment second flange 246, including portions 246A and 246B, is offset slightly towards the outboard end 230 of the peripheral wall 226 compared to the first annular flange 236. An extension portion of the outboard end 230 of the peripheral wall 226 extends in an outboard direction beyond both the first flange and the second flange 246. An inner surface 250 of the second flange portion 246B is spaced away from the outer surface 248 of the peripheral wall 226, which provides an annular space or gap 252 (FIG. 7) formed between the second flange portion and the outer surface 248 of the peripheral wall 226 that is sized to receive lip 306C of bearing housing 306, as shown in FIG. 18. The second flange portion 246B has an outer diameter D3 and an inner diameter D4. Fastener openings 254, which are preferably plain (i.e., unthreaded) openings but that may be threaded, are formed in the second annular flange 246 around the entire peripheral wall 226. Openings 254 formed in the second annular flange 246 correspond in number and position to openings formed in sprocket 204, such that the outer annular flange may be attached to the sprocket. It will be understood that the shape and configuration of the hub adaptor 202 may varied without departing from the spirit and scope of the invention. For example, the peripheral wall 226 may be shortened or lengthened or the size of the annular flanges 236, 246 may be increased or decreased to suit the particular vehicle to which the track assembly 200 is mounted.

In certain embodiments, the inboard surface 236A of the first annular flange 236 is preferably located at (i.e., collinear with) the inboard end 228 of the peripheral wall. However, in preferred embodiments, including the illustrated embodiment (shown best in FIG. 8), the first annular flange 236 is placed slightly inside of the hollow interior 232 (i.e., towards the outboard end) such that the inboard end 228 of the peripheral wall 226 extends slightly beyond the inboard surface 236A of the first annular flange. This forms a recessed area (generally indicated by the area enclosed by a dotted line and marked by reference number "242" in FIG. 8) adjacent the inboard end 228 of the hub adaptor 202 that is defined by the inner surface 238 of the portion of the peripheral wall 226 that is adjacent the inboard surface 236A of the first annular flange 236 and also the inboard surface 236A itself. As shown best in FIG. 10, this circular recessed area 242 is preferably sized to receive and encircle the entirety of the flange 108 of the wheel drive 106 that abuts the inboard surface 236A when the cylindrical end 107 has been fully inserted through the center opening 240 of the hub adaptor 202 (shown best in FIG. 12). Locating the flange 108 in this recessed area 242 assists in centering and reducing movement of the wheel drive 106 within the center opening 240 during the insertion and mounting processes as well as during the use of the track assembly 200.

The above-described openings 254 that are formed in the second flange 246 are used in mounting the hub adaptor 202 to a sprocket, such as the sprocket 204 shown in FIGS. 9 and 10. By mounting the axle 114 (FIG. 2) to wheel drive 106, then mounting the wheel drive to the hub adaptor 202, then mounting the hub adaptor to the sprocket 204, the sprocket turns as the wheel drive turns. Sprocket 204 is formed by two or more sprocket segments 204A and 204B that each include a peripheral tooth section 256 that is provided with a plurality of lug-engaging teeth 258. Teeth 258 are configured to engage lugs 270 (shown in FIG. 5) of the endless track 214 and, through such engagement, to cause the track to circulate about the sprocket 204, rollers 216, and idlers 218, including over an apex formed at the sprocket and then downward around the idlers to form a base that is wider than the apex.

A webbing section 260 is located adjacent and radially inward from the peripheral tooth section 256. The webbing section 260 preferably includes a plurality of weight-reduction openings 262 in order to reduce the overall weight of the track assembly 200. Lastly, an inner flange section 264 is located at the center of the sprocket 204 and includes an inner surface 278 that forms a circular opening 280 in the center of the sprocket. The inner flange section 264 of each sprocket segment 204A, 204B also includes a plurality of openings 268 that are each preferably plain (i.e., unthreaded) openings but may be threaded openings. Fasteners (not shown) pass through corresponding fastener openings 254 in hub adaptor and opening 268 in in sprocket 204 in order to mount the sprocket segments 204A, 204B to the hub adaptor. When the sprocket segments 204A, 204B are joined to the hub adaptor 202, flange segments 266A, 266B form a complete inner flange 266. As will be understood, the openings 244, 254, 268 may differ in terms of type (e.g., threaded vs. smooth), numbers, patterns, depending upon the particular vehicle to which a track assembly 200 is to be attached. In the illustrated embodiment, when mounted to the hub adaptor 202, sprocket segments 204A and 204B are configured to abut one another along a straight cut line 272 and an angled cut line 274. Instead of a second straight cut line, the angled cut line 274 is provided to prevent the cut from passing through a tooth 256, where the sprocket segment would be more likely to fail. Instead, the angled cut line 274, passes through a curved and indented base section 276 located between two adjacent teeth 258. As a result of these two different cut lines, the sprocket segments 204A, 204B are asymmetric (as seen in FIG. 9). However, in other sprockets, including certain smaller diameter sprockets, uniform straight cut lines are used to divide the sprocket into two or more sprocket segments.

Next, as shown best in FIG. 10, the tooth section 256 and webbing section 260 are generally both centered along first axis 282, which extends radially outwards from the center of the sprocket 204. On the other hand, inner flange section 264 is centered along second axis 284, which is offset from the first axis 282 and which also extends radially outwards from the center of the sprocket 204, which creates a "jog" between the end of the webbing section 260 and the end of the inner flange section. In particular, the ends of the webbing section 260 and the inner flange section 264 are preferably rigidly connected together at a connection section 286 that is generally oriented orthogonal to axes 282, 284. Preferably stress-reducing rounded junctions 288 are formed at the inboard and outboard joints between the tooth section 256 and webbing section 260 as well as the outboard joint between the webbing section and the inner flange section 264. A ring-shaped recessed area (generally indicated by the area enclosed by a dotted line and marked by reference number "290" in FIG. 10) is formed at the innermost end of the sprocket segment 204A, 204B (i.e., at inner flange section 264). This recessed area 290 is sized to be at least slightly larger than the outer diameter D3 (FIG. 8) of the second annular flange portion 246B of the hub adaptor 202. In this way, when the sprocket 204 is mounted to the hub adaptor 202 (shown in FIGS. 8 and 18), the second annular flange portion 246B can be placed into this recessed area 290 and into contact with an inboard surface 266C of inner flange 266. Placing the recessed area 290 of the sprocket 204 around the flange 246 in this manner provides collinear alignment between the second flange 246B with the webbing section 260 in a radial direction. In other words, with reference to FIGS. 10 and 18, the second annular flange portion 246B is aligned with the webbing section 260 along a line extending outwards from an outer surface 248 of the peripheral wall 226 and extending through the second annular flange portion and webbing section. Placing the recessed area 290 around the flange 246 also assists in automatically maintaining alignment of the sprocket with the hub adaptor 202 during construction and operation of the track assembly. After the sprocket 204 has been placed onto the hub adaptor 202 in the manner described above, they are then rigidly connected together by passing fasteners 267 through openings 254 in hub adaptor (FIG. 8) and corresponding openings 268 in sprocket (FIG. 9).

Figure 14:
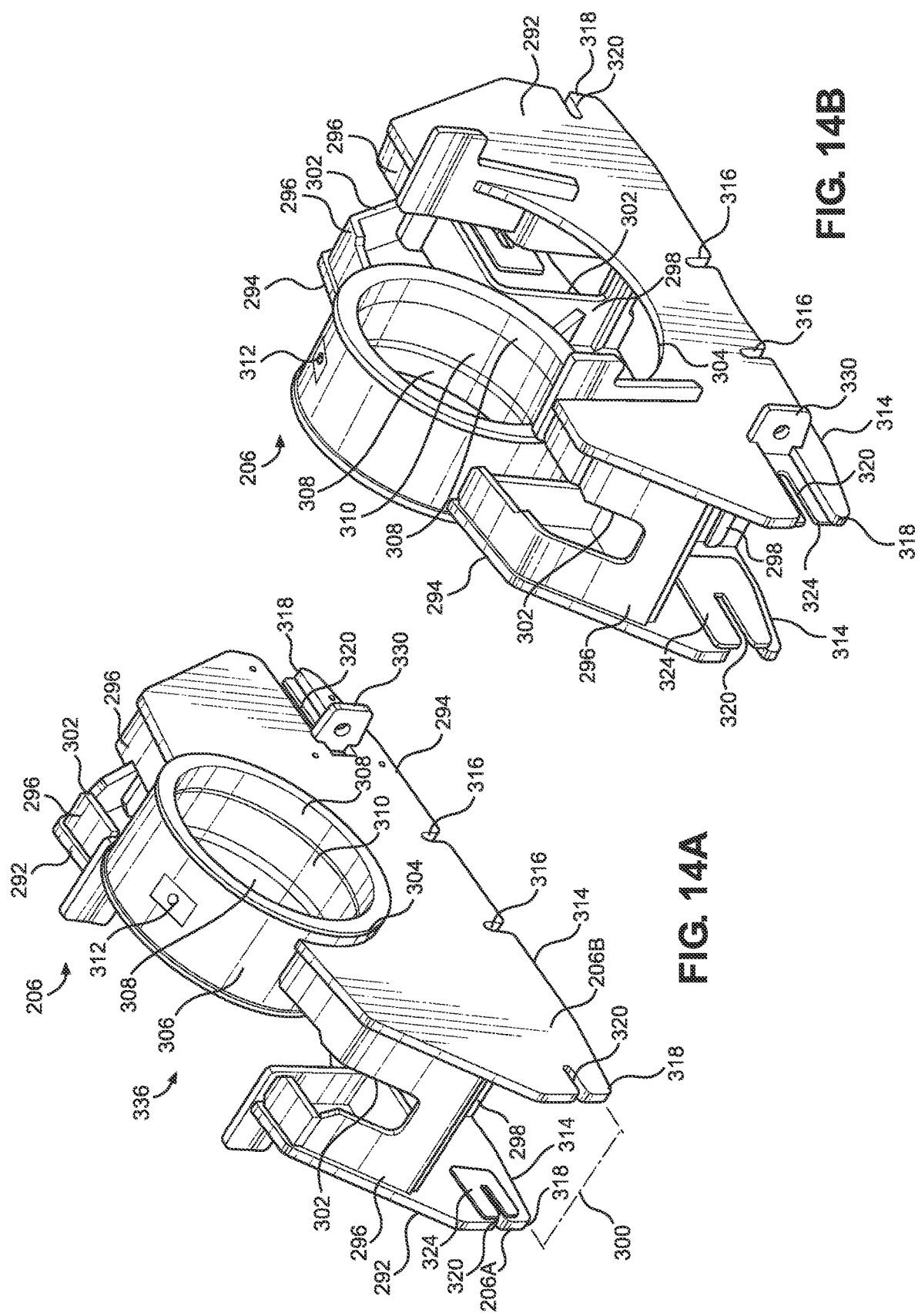
FIGS. 14(A) and 14(B) are front and rear perspective views, respectively, of a frame of the track assembly of FIG. 5.

Next, as shown best in FIGS. 14A and 14B, frame 206 is provided with an inboard end 206A and an outboard end 206B. Frame 206 is formed by an inboard frame member 292 located on the inboard end 206A and an outboard frame member 294 located on the outboard end 206B. Frame members 292, 294 are vertically oriented and parallel with one another and are preferably rigidly held in a spaced apart arrangement by upper supports 296 and lower supports 298 that extend between the frame members and that provide a center gap 300 between them. When the track assembly is in use, the sprocket (not shown) is positioned in the center gap 300 and rotates between frame members 292 and 294. As such, the supports 296 and 298 are each preferably provided with a suitably-sized notched area 302 to enable the sprocket to rotate freely between frame members 292 and 294 and within the notched area.

Additionally, each of the frame members 292 and 294 is provided with a circular cutout 304 formed in each of their top ends. The cutout 304 provided in the inboard frame member 292 is exposed in order to provide a semicircular open area at the top of the frame member, which open area is generally indicated by reference number 336 in FIG. 14A. On the other hand, with respect to the outboard frame member 294, a hollow cylindrical bearing housing 306 having inboard and outboard openings is fixedly located in the cutout 304 of the outboard frame member 294. The bearing housing 306 is sized such that it extends outwards from each of the inboard and outboard sides of the outboard frame member 294. This provides a ring-shaped lip formed by each end of the bearing housing 306, including one lip 306B (shown in FIG. 16) located outside (i.e., outboard) of frame member 294 and another, preferably slightly longer lip 306C, is located inside (i.e., inboard) of that same frame member.

Figure 17:
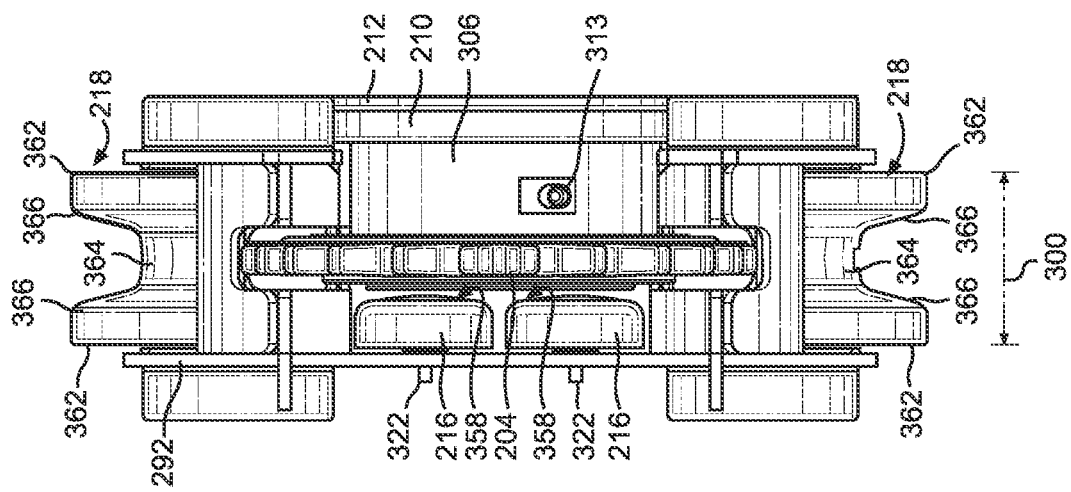
FIG. 17 is a plan view illustrating the track assembly shown in FIG. 11 with the track removed.

Referring again to FIGS. 12 and 16 and with further reference to FIG. 17, when the track assembly 200 is mounted to a vehicle, the steering yoke 104 and the wheel drive 106 extend through the open area 336 (shown in FIG. 14A), past the inboard frame member 292 and into the center gap 300 that is between the inboard frame member and outboard frame member 294. The cylindrical end 107 of the wheel drive 106 is inserted through the center opening 240 of the hub adaptor 202. Next, fasteners 110 connect the flange 108 of the wheel drive 106 to the inner flange 236 of the hub adaptor 202. The hub adaptor 202 is then connected to the sprocket 204 by passing additional fasteners (not shown) through the outer flange 246 of the hub adaptor and through corresponding openings 268 of sprocket 204. Next, the hub adaptor 202 is inserted into the inboard opening of the cylindrical bearing housing 306. The outer surface 248 of the peripheral wall 226 of the hub adaptor 202 is preferably a plain or smooth surface, which facilitates insertion of the hub adaptor into the bearing housing as well as rotation of the hub adaptor within the bearing housing.

Figure 12:
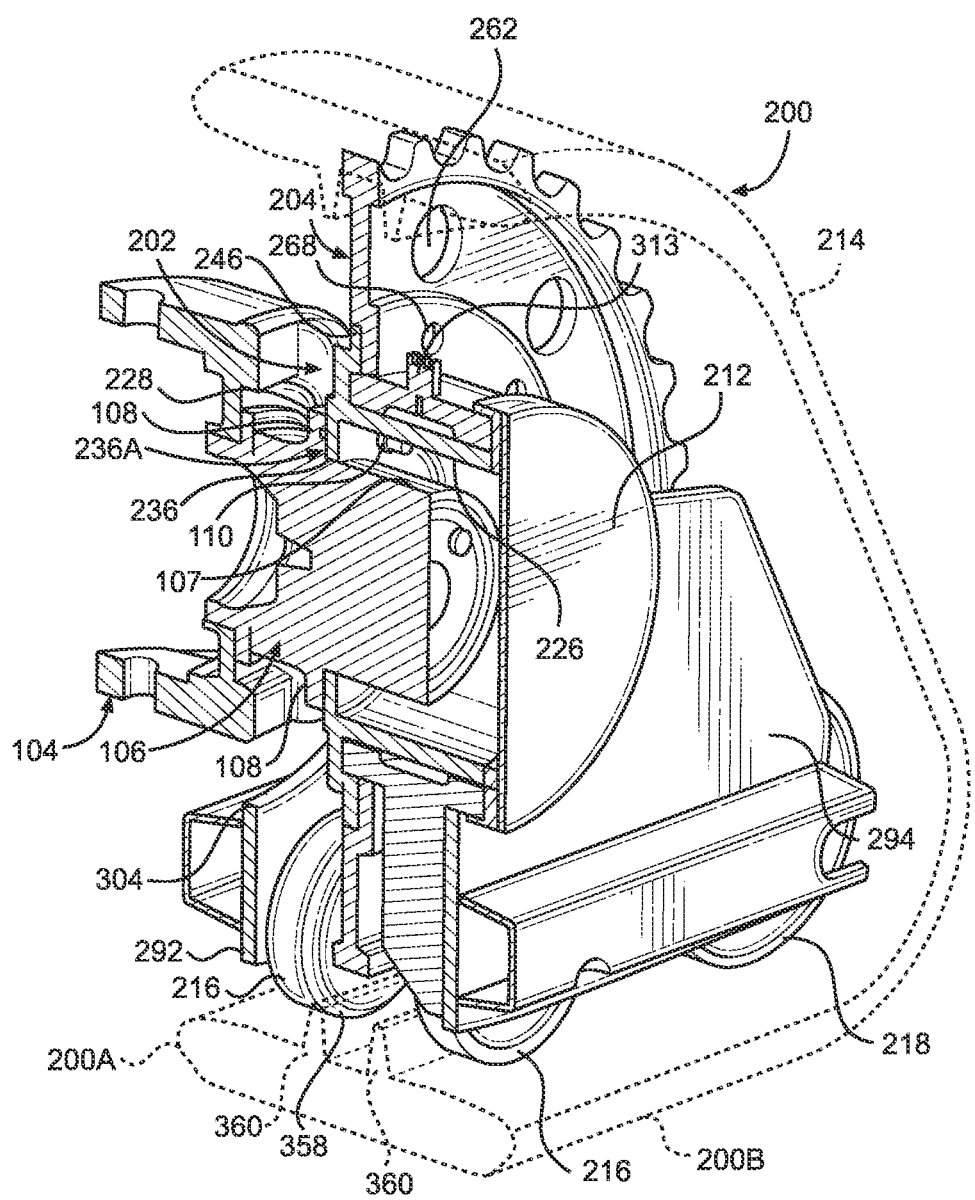
FIG. 12 is a perspective sectional view illustrating the track assembly mounted onto the wheel drive and steering yoke shown in FIG. 11 and taken along plane BB.
Figure 13:
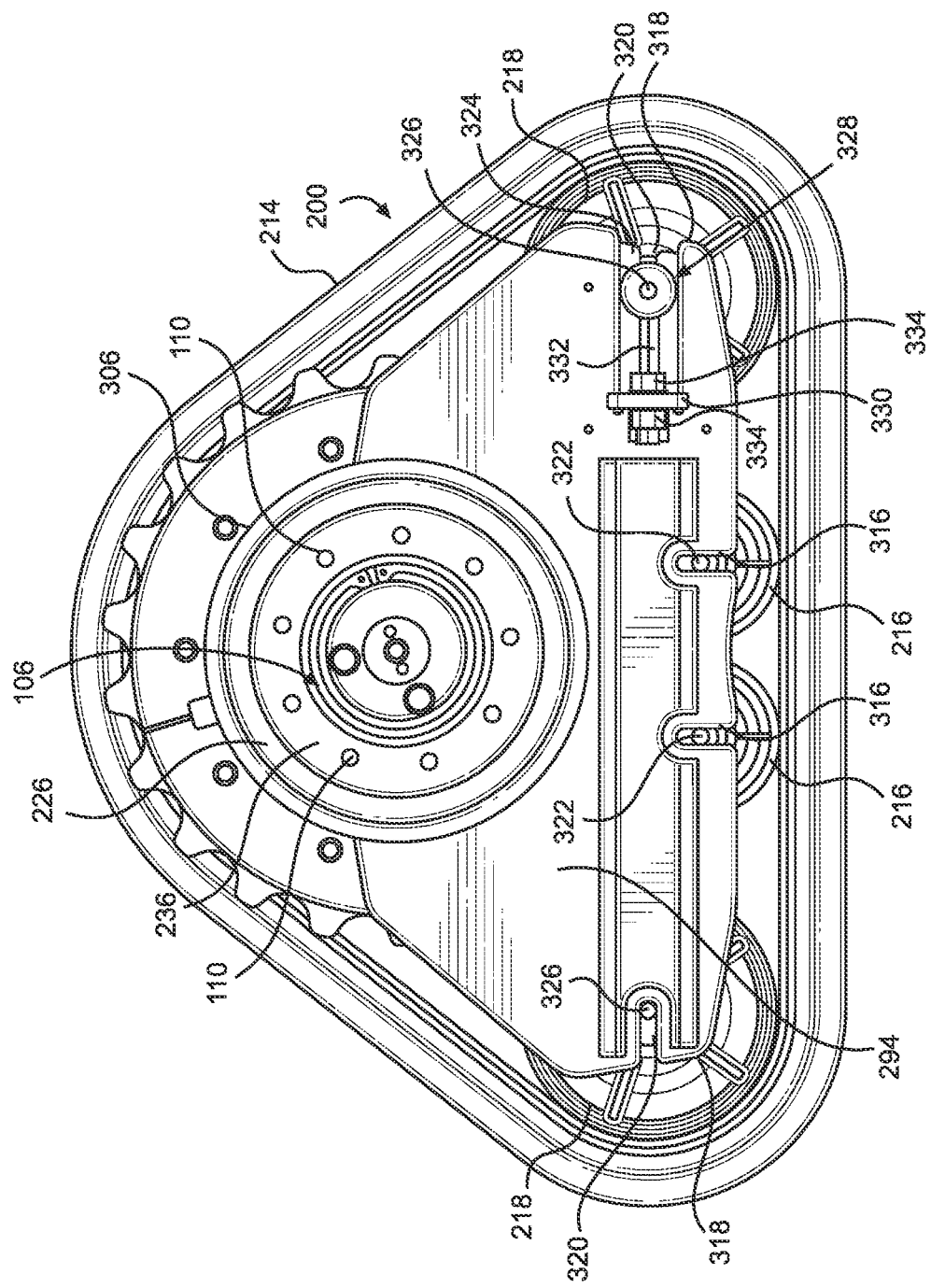
FIG. 13 is a front elevation view illustrating the track assembly of FIG. 4 with a cap plate removed to show a wheel drive mounted to a hub adaptor and a top portion of the sprocket exposed.

With reference to FIGS. 8, 12 and 18, the second flange 246B of the hub adaptor 202 is sized such that its inner diameter D4 is slightly larger than an outer diameter of the cylindrical bearing housing 306, which enables the second flange of the hub adaptor to slide over the inboard lip 306C of the bearing housing. The outboard end of the bearing housing 306 also preferably terminates at approximately the same location as the outboard end of the peripheral wall 226 of the hub adaptor 202. In other words, the outboard lip 306B of the cylindrical bearing housing 306 and the peripheral wall 226 of the hub adaptor 202 extend outwards (i.e., in an outboard direction) from the outboard frame member 294 approximately an equal distance. This enables a ring-shaped bearing retainer 210 to be mounted to the outboard end 230 of the peripheral wall 226 by passing fasteners 342 through the bearing retainer and then into openings 234 (FIG. 8) and, at the same time, for a retention lip 344 of the bearing retainer to extend over the outboard end of the bearing housing 306 in the same way that the second flange portion 246B extends over the inboard end of the bearing housing. This securely mounts the hub adaptor 202 within the bearing housing 306, while still enabling the hub adaptor to rotate within the bearing housing. Lastly, the cap plate 212 may be mounted to the outboard end of the bearing retainer 210 using other fasteners 346.

Figure 16:
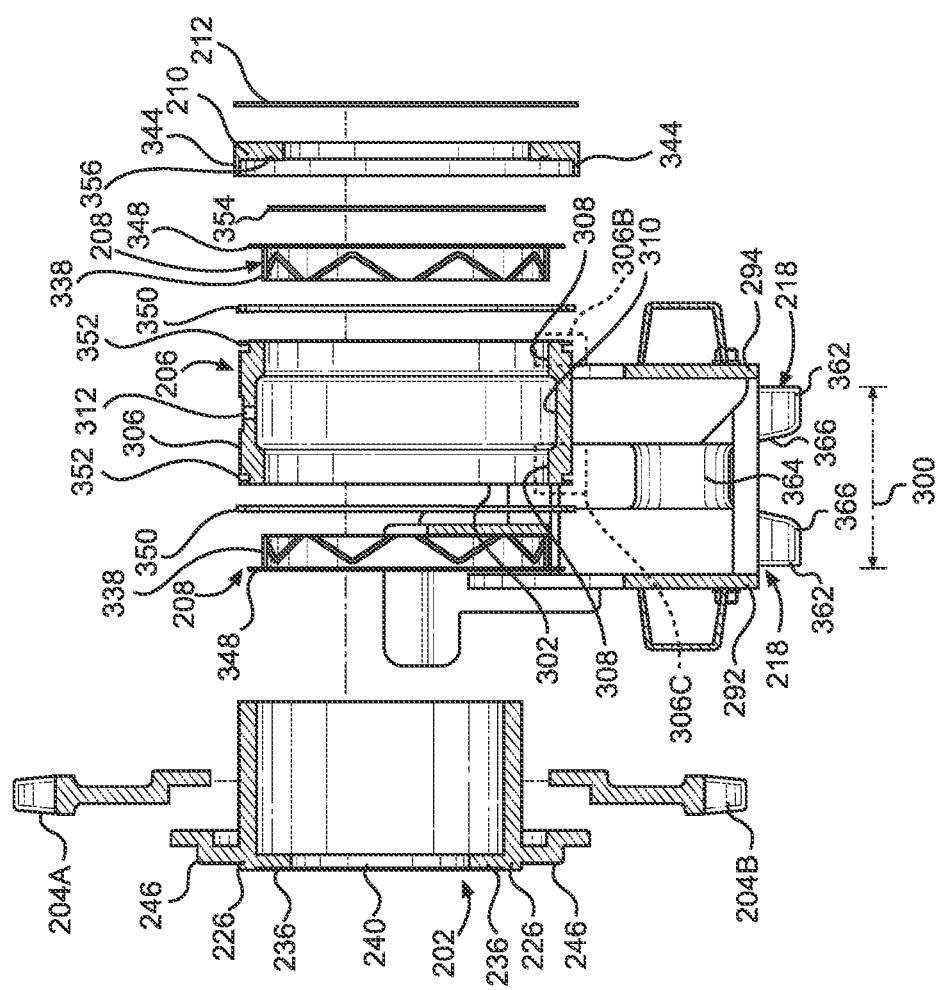
FIG. 16 is an exploded view illustrating a frame, hub adaptor, bearings, and bearing retainer of the track assembly shown in FIG. 12.

As shown in FIGS. 16 and 18, bearing housing 306 includes a pair of inwardly-extending inboard and outboard ridges 308. When the hub adaptor 202 is inserted into the cylindrical bearing housing 306 in the manner discussed above, a ring-shaped grease channel 310 that is configured to hold a quantity of grease is formed between an inside surface of the cylindrical bearing housing 306 and the outer surface 248 of the peripheral wall 226 of the hub adaptor 202. The grease channel 310 extends around the entire hub adaptor 202 and is bounded on inboard and outboard ends by ridges 308. When a vehicle that is equipped with a track assembly 200 of the present invention moves forward or backward, the hub adaptor 202 rotates within the cylindrical bearing housing 306. The bearing retainer 210 and cap plate 212 also rotate with the hub adaptor 202. To prevent or reduce the wear of parts and the creation of excess heat due to friction, bearings 208 are preferably provided between the hub adaptor 202 and bearing housing 306 to prevent them from contacting one another.

Bearings 208 are ring shaped and include a bearing surface 338 and a lip 348 that extends transversely outwards from the bearing surface. While bearing 208 is shown as a single (i.e., unitary) component here, in other embodiments, the bearing may be comprised of multiple separate components. For example, in certain preferred embodiments, bearing 208 is a 3-piece arrangement comprised of 2 half-thrust washers and 1 radial bearing. Preferably, before the hub adaptor 202 is inserted into the opening at the inboard end of the bearing housing 226 or the bearing retainer 210 is mounted over the opening at the outboard end of the bearing housing, bearings 208 are press fit into each of the openings at each end of the bearing housing. The hub adaptor 202 is then inserted through the bearing 208 and into the inboard end of the bearing housing 206 and the bearing retainer 210 is placed over the opposing outboard end of the bearing housing and also over the bearing located there.

Figure 19A:
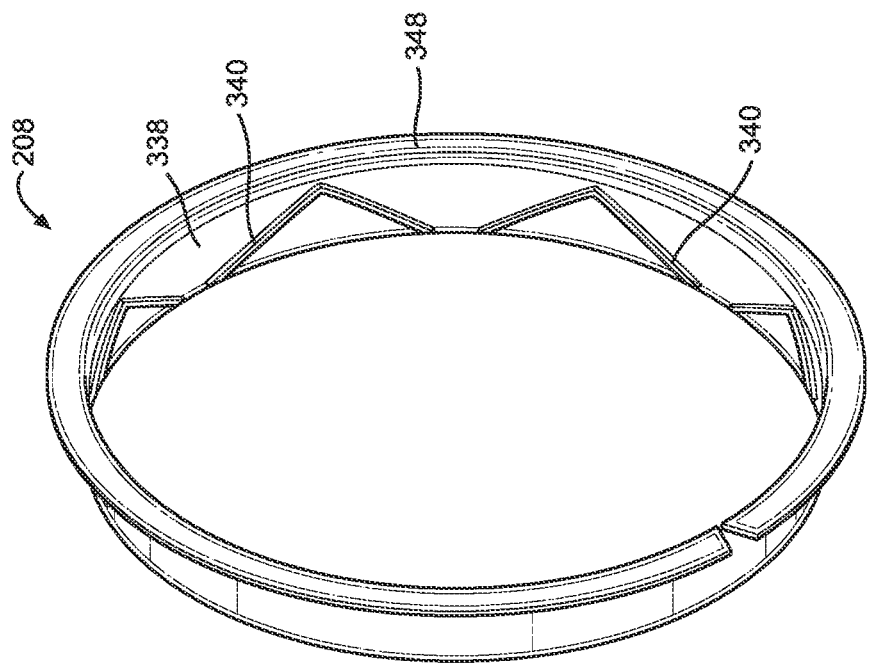
FIGS. 19(A) and 19(B) are perspective views illustrating a bearing used in a track assembly according to an embodiment of the present invention.
Figure 19B:
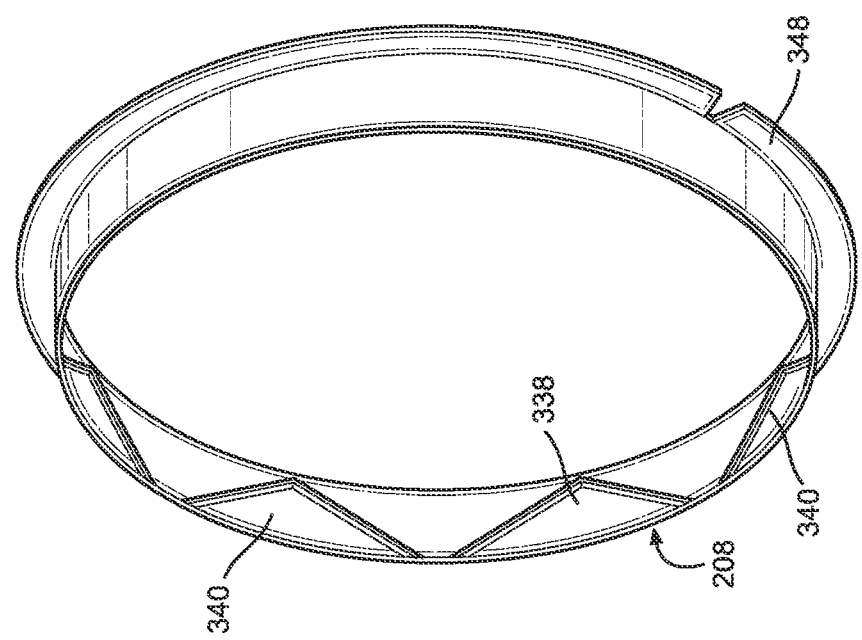

With further reference to FIGS. 19A and 19B, when the bearings 308 and hub adaptor 202 are inserted into the bearing housing 226, one or more bearing channels 340 that are provided in the bearing surface 338 are in communication with the grease channel 310. Preferably, these bearing channels 340 communicate with the grease channel 310 in at least two locations per bearing channel (e.g., an inlet and an outlet). This allows grease from the grease channel 310 to circulate into the bearing channel 340 at one location and to then circulate back out of the bearing channel and into the grease channel via the second location. In certain embodiments, including the illustrated embodiment, the bearing channels 340 extend almost to the outer edge of each of the lips 306B, 306C when the bearings are in place but does not extend beyond that edge, such that grease is provided substantially across the entire portion of the peripheral wall 226 that is adjacent the bearing housing 306. In the illustrated embodiment, each bearing 208 is an alloyed plain metal bearing that is provided with a plurality of V-shaped or chevron-shaped grease channels 340 that extend substantially across the bearing surface 338 but not past the end of the bearing surface.

It is, of course, anticipated that grease may travel beyond the inboard and outboard ends of the bearing housing 306. To assist in preventing or limiting grease leakage, seals are provided. In the illustrated embodiment, ring-shaped labyrinth seals 350 are placed in channels 352 surrounding the outside of the inboard and outboard ends of the bearing housing 306 and preferably compressed by the second annular flange portion 246B of the hub adaptor 202 and retention lip 344 of the bearing retainer 210. Additionally, an O-ring seal 354 is located between the outboard end 230 of the peripheral wall 226 of the hub adaptor 202 and the bearing retainer 210 in a channel 356 formed in the bearing retainer. However, as will be understood, the precise type, nature, and location of the various seals may change to suit the type of vehicle, the type of track assembly, the type of application, the environment, etc. Grease may be injected into the channel 310 via a grease port 312 (FIGS. 14A and 14B), fitted with an appropriate fitting 313 (FIGS. 5 and 18) that is preferably located in an easy to access location, such as on top of the outboard side bearing housing 306, as shown, such that the grease port is accessible from the outboard side of the track assembly when it is mounted to a vehicle.

Next, as shown in FIGS. 5, 13, 14A, and 14B, a bottom end 314 of each of the inboard and outboard frame members 292, 294 is provided with one or more receivers, such as an aperture or elongate slot 316, that are each sized and configured to receive and securely hold a roller 216. An axle 322 of each of the rollers 216 is configured to fit into the slot 316 to enable the roller to rotate. In this particular case, a pair of vertically-oriented slots 316 is provided in each of the frame member 292, 294 and a separate roller 216 is located at each slot (i.e., four total). The vertical position of the rollers 216 may be adjusted by sliding the axle 322 along the length of the slot 316.

In some cases, slots 316 may be oriented at a non-vertical angle. For example, in certain embodiments, slots 316 may be oriented horizontally (i.e., parallel to bottom end 314 of the frame members 292, 294). Horizontal slots 316 would permit the horizontal position of the rollers 216 to be adjusted. In still other cases, slots 316 are oriented at an angle between zero degrees and 90 degrees (e.g., approximately 45 degrees) with respect to the bottom end 314 of the frame members 292, 294. Providing this type of angled slot 316 would enable the vertical position and also the horizontal position of the rollers 216 to be simultaneously adjusted. In other cases, mounting position of the rollers 216 is relatively fixed. In those cases, instead of being formed as an elongate slot, the receiver is formed as a notch, aperture, or the like into which the axle 322 may be positioned and remains in a fixed location.

Figure 15:
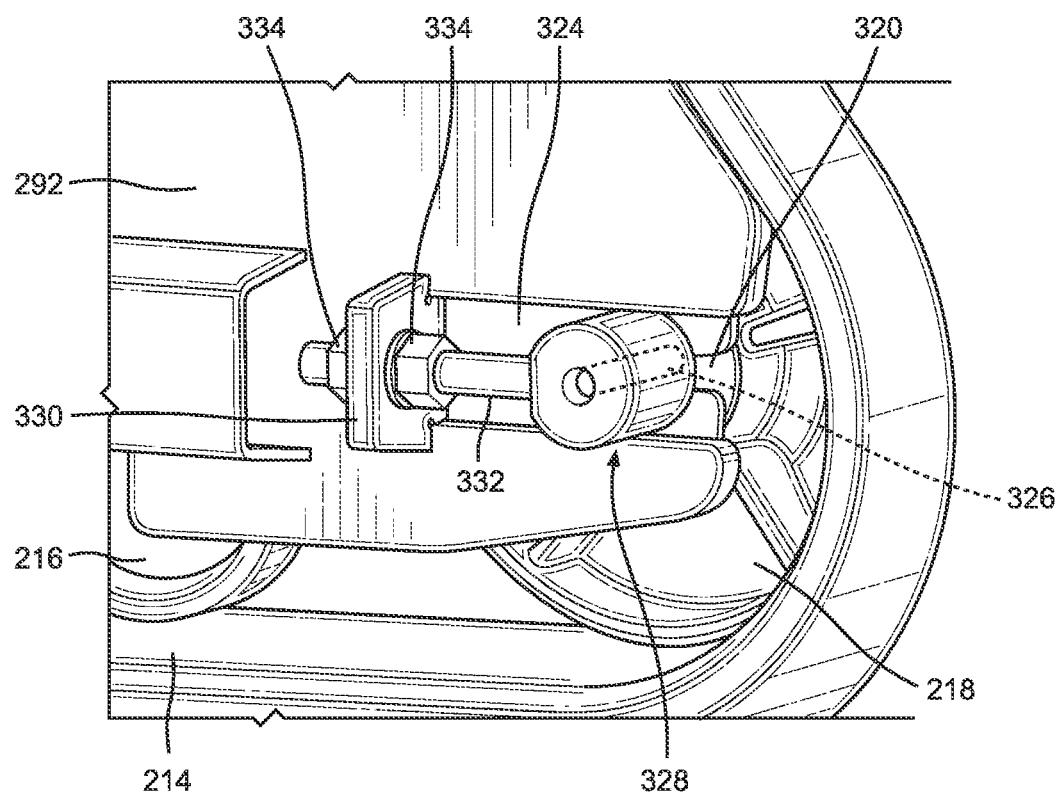
FIG. 15 depicts a tensioning mechanism interposed between a portion of a frame and an idler for tensioning a track of a track assembly according to an embodiment of the present invention.

Next, opposing ends 318 of each of the inboard and outboard frame members 292, 294 also preferably include a similar receiver, such as slot 320, which may be formed in the frame members themselves, in a separate support plate 324 that is preferably fixedly attached to frame members, or both. The slots 320 are each sized and configured to receive an axle 326 that is mounted to the idler 218. As mentioned previously, endless track 214 is placed over and circulates over an apex formed at sprocket 204, rollers 216, and idlers 218. Preferably, idlers 218 function as a tensioning mechanism for the track 214. For that reason, with reference to FIG. 15, idlers 218 are preferably configured to be moveable in the slots 320 between at least two positions that each provide a differing degree of tension in the track 214. In certain embodiments, a tensioning mechanism, such as a threaded tensioner 328 is attached on one end to each one of the axles 326. An opposing end of the tensioner 328 may be connected to a portion of the frame members 292, 294. In the illustrated embodiment, an attachment plate 330 extends outwards from the frame members 292, 294 and a threaded rod 332 that forms part of the tensioner 328 extends through a hole, preferably a threaded hole, formed in the attachment plate. Rotating the threaded rod 332 in one direction causes the axle 326 to advance away from the plate 330 and to, thereby, incrementally increase the tension in the track 214. Rotating the threaded rod 332 in the opposite direction draws the axle 326 towards the plate and, thereby, reduces the tension in the track 214. Nuts 334 are preferably placed onto the threaded rod 332 on each side of the plate 330 in order to fix the axle 326 at a selected location and to maintain a desired amount of tension in the track 214.

With reference to FIGS. 5, 12, 13 and 17, when the axles 322 of the rollers 216 engage the slots 316 formed in the frame members 292, 294, the rollers are preferably located and rotate between the frame members. Preferably, an inner surface 358 of the rollers 216, which in this case is provided with a curved transition formed between its bottom and side surfaces, contacts a raised centering ridge 360 that is formed along the center of the track 214. In this case, track 214 is provided with a parallel rows of centering ridges 360 that may extend, either continuously or in separate segments, along the entire length of the track. These ridges 360 are spaced apart from one another to provide a space between them where the lugs 270 that engage with the teeth 258 of the sprocket 204 are located.

Similarly, the idlers 218, which are located at opposing ends 318 of the frame members 292, 294, are formed in a somewhat spindle shape that includes large rolling portions 362 that engage the axles 326 and threaded tensioners 328. The rolling portions 362 are preferably configured to contact the track 214 and are joined together by a smaller middle connector 364 that is preferably spaced away from the track such that the lugs 270 may pass under the middle connector as the track circulates. Opposing inner surfaces 366 of the rolling portions 362 preferably also contact the centering ridges 360 of the track 214. This contact between the rollers 216 and the idlers 218 and the centering ridges 360 provides a centering force on each side (i.e., inboard and outboard) of the track that keeps the track centered as it circulates about the sprocket 204, rollers, and idlers.

In this particular case, each of the slots 320 provided in the frame member 292, 294 are oriented horizontally and axles 326 extend from each side the idlers 218 to engage the slots. However, in some cases, slots 328 may be oriented at a non-horizontal angle, including at a positive angle (i.e., where a first end of the slot is located vertically above a second end of the slot) or negative angle (i.e., where the first end of the slot is located vertically below the second end of the slot). For example, in certain embodiments, slots 328 may be oriented at an angle of approximately 45 degrees with respect to the bottom end 314 of the frame members 292, 294. Providing this type of angled slot 316 would enable the vertical position and also the horizontal position of the rollers 216 to be simultaneously adjusted. In other cases, mounting position of the rollers 216 is relatively fixed. In those cases, instead of being formed as an elongate slot, the receiver is formed as a notch, aperture, or the like into which the axle 322 may be positioned and remains in a fixed location.

Figure 21:
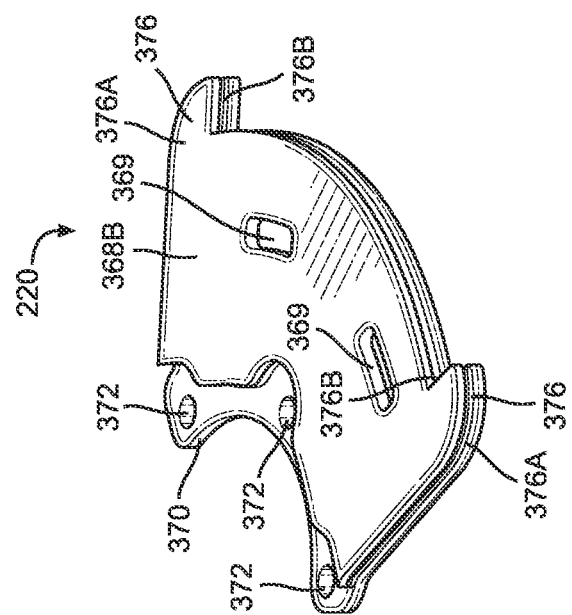
FIG. 21 is a perspective view illustrating the rotation limiter plate of FIGS. 20(A) and 20(B)
Figures 20A, 20B:
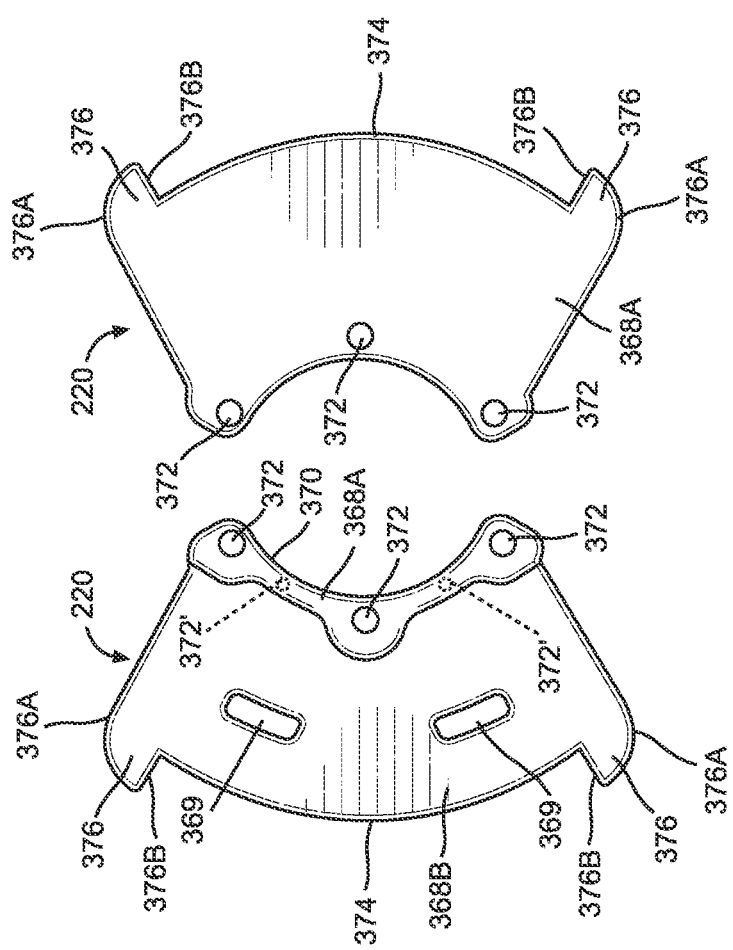
FIGS. 20(A) and 20(B) are front and rear views, respectively, of a rotation limiter plate used in limiting rotation of a frame of a track assembly with respect to an axle to which the track assembly is mounted according to an embodiment of the present invention.

Referring again to FIGS. 14A and 14B and with further reference to FIGS. 20-22, certain embodiments of the present invention are provided with a rotation limiting assembly that limits the rotation of the frame 106 of the track assembly 200 with respect to the steering yoke 104. This rotating limiting assembly is comprised of a limiter plate 220 that is fixedly mounted to the inboard side of steering yoke 104, which interacts with a corresponding frame stop 368 that is fixedly mounted to a portion of the frame 206 in order to limitation the degree of clockwise and counterclockwise rotation of the track assembly with respect to the steering yoke (and axle) during operation. In the illustrated embodiment, frame stop 368 is formed by a pair of arc-shaped plates, including an inboard plate 368A and an outboard plate 368B, that are stacked and fixedly connected together such as through welding. However, in other embodiments, a single plate or other greater numbers of plates may be used to form frame stop 368. In this particular embodiment, openings 369 are located in outboard plate 368B to provide additional welding sites in order to facilitate welding the plates to one another. Each frame stop 368 includes a semi-circular inner edge 370. A plurality of fastener openings 372 are provided in the frame stop 368 proximate inner edge 370. Additionally, each frame stop 368 includes a larger semi-circular outer edge 374 and prongs 376 that extend outwardly from each of the ends of the outer edge. Prongs 376 are formed by a curved outer edge 376A that is joined with a flat inner edge 376B. The semi-circular outer edge 374 is preferably connected continuously between the flat inner edges 376B of each of the prongs 376.

When a frame stop 368 is mounted to a steering yoke 104 and the steering yoke is mounted to track assembly 200, frame stops 368 are located on the left and right sides of the wheel drive. In mounting frame stops 368 to steering yoke 104, lip 370 is positioned onto the inboard side of the steering yoke such that the semi-circular inner surface partially surrounds wheel drive 106. Fasteners (not shown) are inserted through openings 372 and are secured in steering yoke 104 in order to fixedly mount the frame stop to the inboard side of the steering yoke. When the track assembly 200 is in use, the frame 206 may rotate with respect to the steering yoke 104. Preferably, steering axis 104 will remain in a fixed upright orientation along horizontal axis 380. Rotation of the frame 206 is limited when the frame stop 368, which rotates with the frame about the steering yoke 104, comes into contact with one of the prongs 376 of the rotation limiter plate 220 mounted to the steering yoke. The frame stop 368 is configured to contact one of the prongs 376 after a certain amount of rotation in a first rotational direction and to contact the other one of the prongs after a certain amount of rotation in a second rotational direction. In the illustrated embodiment, rotation in a first direction 378 is limited to 30 degrees (i.e., 30 degrees above horizontal axis 380), whereas rotation in a second direction 382 is limited to 22 degrees (i.e., 22 degrees below horizontal axis 380). The amount of rotation that is permitted may be varied by changing the spacing between the prongs 376 as well as the mounting location and orientation of the frame stop 368 and limiter plate 220. For example, the mounting position and orientation of the limiter plate 220 could be easily changed by using alternative fastener openings 372' in place of openings 372. Additionally, in preferred embodiments, frame stops 368 are mounted to opposing ends of the cutout 304 of the inboard frame member 292 such that they are located on either side of the steering yoke 104. This allows for the rotation limiting assembly to be used on either side of the vehicle. The frame stop 368 that is contacted by limiter plate 220 depends on the side of the vehicle that the rotation limiting assembly is located on.

Figure 25:
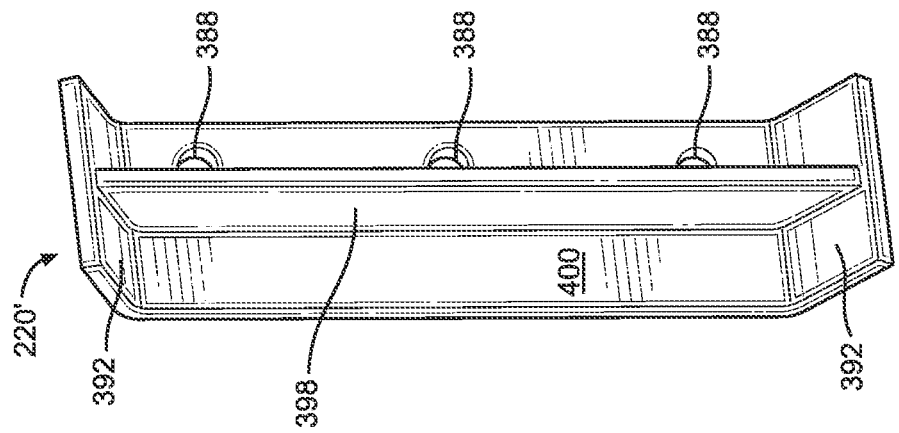
FIG. 25 is a front perspective view of the rotation limiter plate of FIG. 23.
Figure 24:
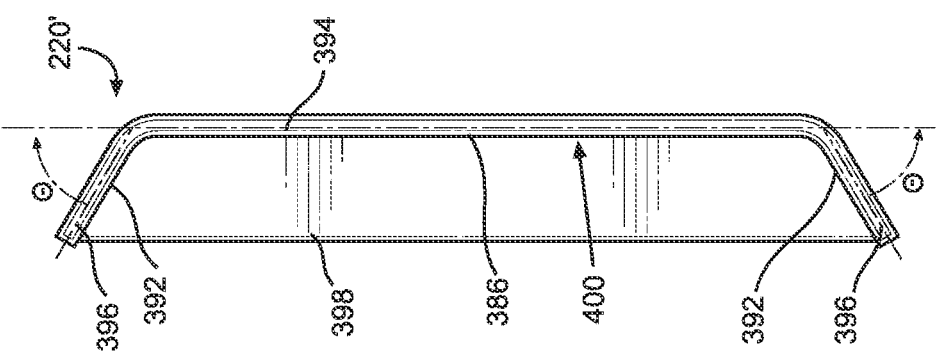
FIG. 24 is rear elevation view of the rotation limiter plate of FIG. 23.
Figure 23:
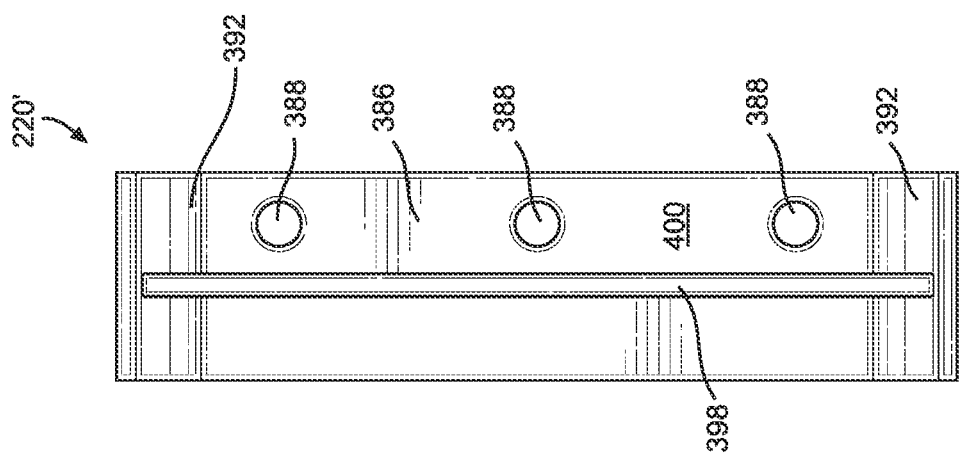
FIG. 23 is a side elevation view of a rotation limiter plate used in limiting rotation of a frame of a track assembly with respect to a rear axle to which the track assembly is mounted according to an embodiment of the present invention.
Figure 26:
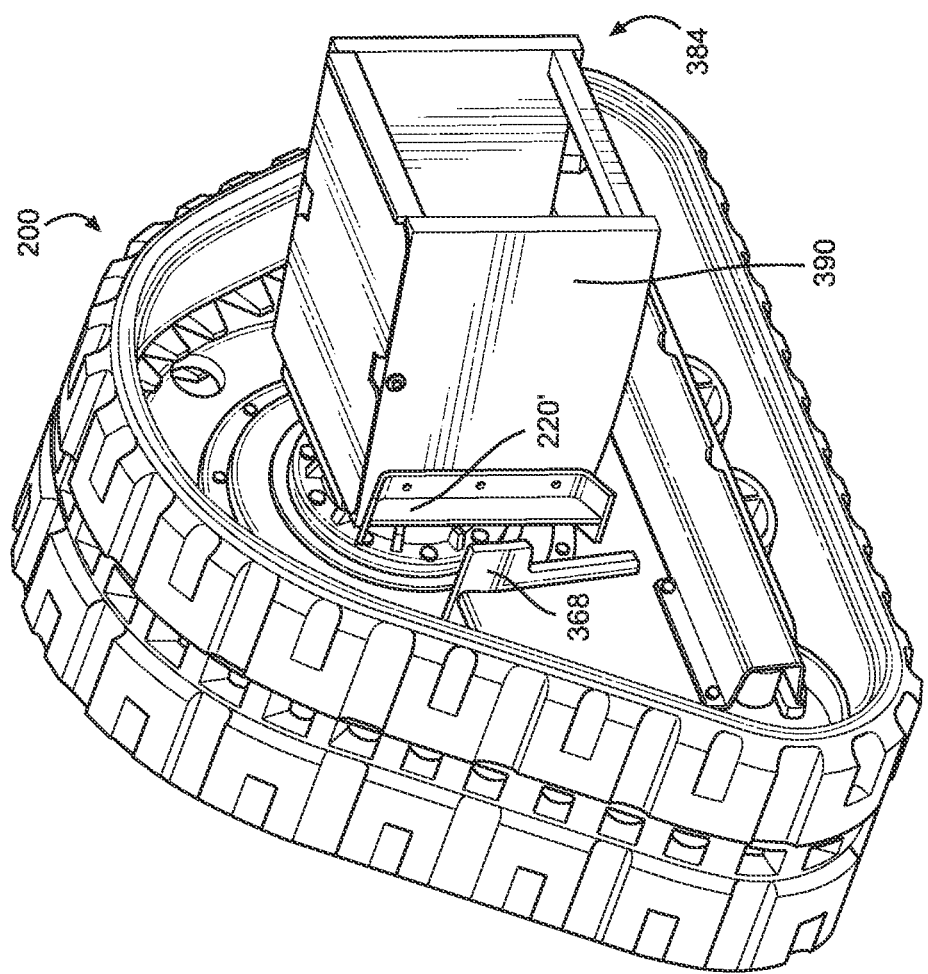
FIG. 26 is a rear perspective view depicting a track assembly mounted to an axle of a vehicle and a rotation limiter plate of FIG. 23 mounted to a portion of a chassis of the vehicle.

When steering yoke is unavailable as a mounting location for the rotation limiter plate 220 discussed above, such as with a non-steerable drive wheel, alternative mounting locations and/or alternative limiter plate designs may be utilized. An example of an alternative rotation limiting assembly is shown in FIGS. 23-26, where an alternative limiter plate 220' is mounted to a portion of a portion of a chassis 384 of a vehicle (not shown) and interacts with a frame stop 368 in a similar manner as discussed above. Limiter plate 220' includes a mounting face 386 that is secured directly to a portion of the chassis 384 by passing fasteners (not shown) through openings 388 and into corresponding openings in the chassis. In this case, limiter plate 220' is mounted to a left vertical surface 390 (as seen in FIG. 25) of the chassis 384 but may be mounted to a right vertical surface (not shown) to allow the track assembly to be used on either side of the vehicle. A shoulder 392 extends away from mounting face 386 at an angle Θ, that is measured between midline 394 extending through mounting face and midline 396 extending through each shoulder. In certain embodiments, angle Θ is between 10° and 80°. More preferably, angle Θ is between 30° and 60°. In still other embodiments, angle Θ is approximately 45°. Lastly, in certain preferred embodiments, a strengthening rib 398 is fixedly mounted to an outward-facing surface 400 (i.e., the surface facing away from the chassis 384) of the mounting face 386 and both shoulders 394 for providing increased strength to the limiter plate 220'.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:

1. A track assembly configured to mount to an outboard end of a rotating wheel drive of a vehicle, wherein the wheel drive has an inboard end located opposite the outboard end, the track assembly comprising:
    a frame with a first end and a second end and is formed by an inboard frame member and an outboard frame member that are held in a rigid spaced apart configuration;
    a center gap formed between the inboard and outboard frame members;
    a bearing housing rigidly mounted to the outboard frame member;
    a hub adaptor having a peripheral wall forming a hollow interior sized to receive a portion of the wheel drive, a first annular flange connected to and extending inwards from an inner surface of the peripheral wall and configured to rigidly connect to the outboard end of the wheel drive, and a second annular flange connected to and extending outwardly away from an outer surface of the peripheral wall, wherein the hub adaptor is configured to engage and to rotate with respect to the bearing housing;
    a sprocket surrounding the hub adaptor and connected to the second annular flange thereof such that, as the hub adaptor rotates within the bearing housing, the sprocket rotates within the center gap of the frame;
    an idler rotatably connected to the first and second ends of the frame; and
    an endless track arranged in a generally triangular configuration around the frame by being routed over a top portion of the sprocket to form an apex and also routed around each of the idlers to form a base that is wider than the apex, the endless track engaged with the sprocket at the apex and driven by rotation of the sprocket in order to circulate the track about the frame in a generally triangular path.

2. The track assembly of claim 1 further comprising an inboard cutout formed in the inboard frame member and an outboard cutout formed in the outboard frame member, wherein the bearing housing is fixedly mounted within the outboard cutout and wherein the inboard frame cutout is sized and configured to enable the outboard end of the wheel drive to extend into the center gap for engaging the hub adaptor between the inboard and outboard frame members.

3. The track assembly of claim 1 wherein the vehicle includes steering yoke mounted to the inboard end of the wheel drive and wherein the track assembly further comprises a rotation limiting assembly that is configured to limit rotation of the track assembly with respect to the steering yoke, the rotation limiting assembly comprising:
    a limiter plate the is fixedly mounted to an inboard side of the steering yoke; and
    a frame stop that is fixedly mounted to a portion of the frame,
    wherein the limiter plate is configured to interact with the frame stop in order to limit a degree of clockwise and counterclockwise rotation of the track assembly with respect to the steering yoke during operation.

4. The track assembly of claim 3 wherein the limiter plate includes a semi-circular inner edge and a larger semi-circular outer edge such that the limiter plate is a partial annulus in shape, the limiter plate further includes prongs ends outwards from each of the outer edge, wherein each of the prongs is configured to contact the frame stop in order to limit the rotation of the track assembly with respect to the steering yoke.

5. The track assembly of claim 1 wherein the peripheral wall is cylindrical in shape.

6. The track assembly of claim 1 wherein the second annular flange is comprised of:
    a first annular flange portion that is connected to the outer surface of the peripheral wall; and
    a second annular flange portion connected to the first annular flange portion and that has a larger diameter than a diameter of the first annular flange portion such that the second annular flange surrounds an outside of the first annular flange, wherein the second annular flange portion is offset from the first annular flange in an outboard direction such that an inner surface of the second flange portion is spaced away from the outer surface of the peripheral wall to provide an annular gap between the inner surface of the second flange portion and the outer surface of the peripheral wall that is sized to receive a portion of the bearing housing.

7. The track assembly of claim 1 wherein the sprocket is comprised of:
    a peripheral tooth section that is provided with a plurality of lug-engaging teeth that are configured to engage lugs provided on the endless track;

a webbing section that is located adjacent and radially inward from the peripheral tooth section; and an inner flange section that is located adjacent and radially inward from the webbing section and that includes an inner surface that forms a circular opening in the center of the sprocket, wherein the inner flange is offset from webbing section in an outboard direction to provide a recessed area, wherein the inner flange is configured to removably connect to the second annular flange of the hub adaptor and wherein connecting the inner flange of the sprocket to the second annular flange portion of the hub adaptor provides collinear alignment between the second flange with the webbing section taken in a radial direction along a line extending outwards from the outer surface of the peripheral wall and extending through the second annular flange portion and webbing section.

8. The track assembly of claim 7 further comprising stress-reducing rounded junctions formed between at least one of: (i) the peripheral tooth section and the webbing section and (ii) the webbing section and the inner flange section.

9. The track assembly of claim 1 wherein:
the bearing housing includes a ring-shaped lip that provides an inboard opening; and
wherein an outboard end of the peripheral wall extends in an outboard direction beyond both the first and second annular flanges of the hub adaptor,
wherein the outboard end of the peripheral wall is sized and configured for insertion into the inboard opening of the ring-shaped lip of the bearing housing such that the peripheral wall of the hub adaptor rotates within the bearing housing.

10. The track assembly of claim 9 wherein the ring-shaped lip further provides an outboard opening through which the hub adaptor may be directly connected to the wheel drive.

11. The track assembly of claim 10 further comprising:
a ring-shaped bearing retainer having a central opening, the ring-shaped bearing retainer configured to mount to the outboard end of the peripheral wall of the hub adaptor and including a retention lip that extends radially outward over an outboard end of the ring-shaped lip for securely mounting the hub adaptor within the bearing housing while enabling the hub adaptor to rotate within the bearing housing and while enabling the track assembly to be accessed via the outboard opening.

12. The track assembly of claim 11 further comprising:
channels formed in an outer surface of the bearing housing, including a first channel surrounding the inboard end of the ring-shaped lip and a second channel surrounding the outboard end of the ring-shaped lip;
a third channel formed in an abutting surface of the second annular flange that is configured to abut the outer surface of the bearing housing at the inboard end of the ring-shaped lip;
a fourth channel formed in an abutting surface of the ring-shaped bearing retainer that is configured to abut the outer surface of the bearing housing at the outboard end of the ring-shaped lip;
an inboard seal extending between the first and third channels; and
an outboard seal extending between the second and fourth channels.

13. The track assembly of claim 11 further comprising a cap plate configured to mount over the central opening of the ring-shaped bearing retainer.

14. The track assembly of claim 11 further comprising:
a first ring-shaped bearing having:
a bearing surface that is configured for placement between the outer surface of the peripheral wall and an inner surface of the ring-shaped lip proximate the outboard opening of the bearing housing;
a lip that extends transversely outwards from the bearing surface and is configured for placement between the outboard end of the ring-shaped lip and the bearing retainer; and
a second ring-shaped bearing having:
a bearing surface that is configured for placement between the outer surface of the peripheral wall and the inner surface of the ring-shaped lip proximate the inboard opening of the bearing housing; and
a lip that extends transversely outwards from the bearing surface and is configured for placement between an inboard end of the ring-shaped lip and the second annular flange of the hub adaptor.

15. The track assembly of claim 14 further comprising a plurality of V-shaped grease channels extending across an inner portion of the bearing surface but not beyond the bearing surface of each of the bearings.

16. The track assembly of claim 1 further comprising one or more corresponding pairs of intermediate rollers rotatably mounted to the frame between idlers, including one roller of each pair mounted to each of the inboard frame member and the outboard frame member.

17. A hub adaptor for a track assembly for use in connecting to a wheel drive of a vehicle, wherein the track assembly includes a sprocket that circulates an endless track around the track assembly, the hub adaptor comprising:
a peripheral wall forming a hollow interior sized to receive a portion of the wheel drive of said vehicle;
a first annular flange connected to and extending inwards from an inner surface of the peripheral wall and configured to rigidly connect to an outboard end of the wheel drive; and
a second annular flange connected to and extending outwardly away from an outer surface of the peripheral wall and configured to rigidly connect to the sprocket of the track assembly.

18. The hub adaptor of claim 17 further comprising:
a first annular flange portion that is connected to the outer surface of the peripheral wall; and
a second annular flange portion connected to the first annular flange portion and that has a larger diameter than a diameter of the first annular flange portion such that the second annular flange surrounds an outside of the first annular flange, wherein the second annular flange portion is offset from the first annular flange in an outboard direction such that an inner surface of the second flange portion is spaced away from the outer surface of the peripheral wall to provide an annular gap between the inner surface of the second flange portion and the outer surface of the peripheral wall.

19. The hub adaptor of claim 17 further wherein an outboard end of the peripheral wall extends in an outboard direction beyond both the first and second annular flanges of the hub adaptor.

20. A quick connect method for mounting a track assembly to an outboard end of a rotating wheel drive of a vehicle, the method comprising the steps of:

providing said wheel drive; and providing said track assembly, wherein the track assembly includes:

a frame with a first end and a second end and is formed by an inboard frame member and an outboard frame member that are held in a rigid spaced apart configuration;

a center gap formed between the inboard and outboard frame members;

a hub adaptor having a peripheral wall forming a hollow interior sized to receive a portion of the wheel drive, a first annular flange connected to and extending inwards from an inner surface of the peripheral wall and configured to rigidly connect to the outboard end of the wheel drive, and a second annular flange connected to and extending outwardly away from an outer surface of the peripheral wall;

a bearing housing rigidly mounted to the outboard frame member and having a ring-shaped lip that provides an inboard opening and an outboard opening that provides direct access to the first annular flange of the hub adaptor, wherein an outboard end of the peripheral wall of the hub adaptor extends in an outboard direction beyond both the first and second annular flanges of the hub adaptor and into the inboard opening of the ring-shaped lip of the bearing housing and wherein the peripheral wall of the hub adaptor is permitted to rotate within the bearing housing;

a sprocket surrounding the hub adaptor and connected to the second annular flange thereof such that, as the peripheral wall of the hub adaptor rotates within the bearing housing, the sprocket rotates within the center gap of the frame;

an idler rotatably connected to the first and second ends of the frame;

an endless track arranged in a generally triangular configuration around the frame by being routed over a top portion of the sprocket to form an apex and also routed around each of the idlers to form a base that is wider than the apex, the endless track engaged with and driven by rotation of the sprocket in order to circulate the track about the frame in a generally triangular path; and while directly accessing the first annular flange of the hub adaptor from an outboard side of the track assembly via the outboard end of the ring-shaped lip, mounting the first annular flange to the wheel drive.

\* \* \* \* \*